United States Patent
Serret-Avila et al.

(10) Patent No.: US 7,107,452 B2
(45) Date of Patent: Sep. 12, 2006

(54) METHODS AND SYSTEMS FOR ENCODING AND PROTECTING DATA USING DIGITAL SIGNATURE AND WATERMARKING TECHNIQUES

(75) Inventors: Xavier Serret-Avila, Santa Clara, CA (US); Gilles Boccon-Gibod, Los Altos, CA (US)

(73) Assignee: Intertrust Technologies Corp., Sunnyvale, CA (US)

( * ) Notice: Subject to any disclaimer, the term of this patent is extended or adjusted under 35 U.S.C. 154(b) by 0 days.

(21) Appl. No.: 11/209,238

(22) Filed: Aug. 22, 2005

(65) Prior Publication Data

US 2005/0283610 A1   Dec. 22, 2005

Related U.S. Application Data

(63) Continuation of application No. 10/897,001, filed on Jul. 23, 2004, now Pat. No. 6,961,854, which is a continuation of application No. 09/588,652, filed on Jun. 7, 2000, now Pat. No. 6,785,815.

(60) Provisional application No. 60/138,171, filed on Jun. 8, 1999.

(51) Int. Cl.
*H06F 1/26* (2006.01)

(52) U.S. Cl. .................. 713/176; 713/182; 713/189

(58) Field of Classification Search ............... 713/176, 713/182, 189
See application file for complete search history.

(56) References Cited

U.S. PATENT DOCUMENTS

| | | | |
|---|---|---|---|
| 4,827,508 A | | 5/1989 | Shear |
| 5,513,260 A | * | 4/1996 | Ryan .................. 380/200 |

(Continued)

FOREIGN PATENT DOCUMENTS

AU   A-36840/97   2/1998

(Continued)

OTHER PUBLICATIONS

Dinsdale, Scott, *A Framework for SDMI*, Feb. 26, 1999, pp. 1-19.

(Continued)

*Primary Examiner*—Thomas R. Peeso
(74) *Attorney, Agent, or Firm*—Finnegan Henderson Farabow Garrett & Dunner LLP

(57) ABSTRACT

Systems and methods are provided for protecting and managing electronic data signals that are registered in accordance with a predefined encoding scheme, while allowing access to unregistered data signals. In one embodiment a relatively hard-to-remove, easy-to-detect, strong watermark is inserted in a data signal. The data signal is divided into a sequence of blocks, and a digital signature for each block is embedded in the signal via a watermark. The data signal is then stored and distributed on, e.g., a compact disc, a DVD, or the like. When a user attempts to access or use a portion of the data signal, the signal is checked for the presence of a watermark containing the digital signature for the desired portion of the signal. If the watermark is found, the digital signature is extracted and used to verify the authenticity of the desired portion of the signal. If the signature-containing watermark is not found, the signal is checked for the presence of the strong watermark. If the strong watermark is found, further use of the signal is inhibited, as the presence of the strong watermark, in combination with the absence or corruption of the signature-containing watermark, provides evidence that the signal has been improperly modified. If, on the other hand, the strong mark is not found, further use of the data signal can be allowed, as the absence of the strong mark indicates that the data signal was never registered with the signature-containing watermark.

22 Claims, 20 Drawing Sheets

U.S. PATENT DOCUMENTS

| | | | |
|---|---|---|---|
| 5,613,004 A | | 3/1997 | Cooperman et al. |
| 5,636,292 A | * | 6/1997 | Rhoads ................ 382/232 |
| 5,659,613 A | | 8/1997 | Copeland et al. |
| 5,671,389 A | * | 9/1997 | Saliba ................ 711/111 |
| 5,739,864 A | | 4/1998 | Copeland |
| 5,774,452 A | | 6/1998 | Wolosewicz |
| 5,809,139 A | | 9/1998 | Girod et al. |
| 5,822,432 A | | 10/1998 | Moskowitz et al. |
| 5,828,325 A | | 10/1998 | Wolosewicz et al. |
| 5,892,900 A | | 4/1999 | Ginter et al. |
| 5,896,454 A | | 4/1999 | Cookson et al. |
| 5,910,987 A | | 6/1999 | Ginter et al. |
| 5,920,861 A | | 7/1999 | Hall et al. |
| 5,940,135 A | | 8/1999 | Petrovic et al. |
| 5,940,504 A | | 8/1999 | Griswold |
| 5,940,505 A | | 8/1999 | Kanamaru |
| 5,943,422 A | | 8/1999 | Van Wie et al. |
| 5,999,949 A | | 12/1999 | Crandall |
| 6,005,501 A | | 12/1999 | Wolosewicz |
| 6,009,170 A | | 12/1999 | Sako et al. |
| 6,047,374 A | | 4/2000 | Barton |
| 6,064,764 A | | 5/2000 | Bhaskaran et al. |
| 6,112,181 A | | 8/2000 | Shear et al. |
| 6,145,081 A | | 11/2000 | Winograd et al. |
| 6,157,721 A | | 12/2000 | Shear et al. |
| 6,185,683 B1 | | 2/2001 | Ginter et al. |
| 2001/0042043 A1 | | 11/2001 | Shear et al. |

FOREIGN PATENT DOCUMENTS

| | | |
|---|---|---|
| EP | 0 750423 A2 | 12/1996 |
| EP | 0 845 758 A2 | 6/1998 |
| EP | 0 903 943 A2 | 3/1999 |
| WO | WO 98/10381 | 3/1998 |
| WO | WO 99/48296 | 9/1999 |
| WO | WO 00/44131 | 7/2000 |

OTHER PUBLICATIONS

*Q & A Concerning the Phase II Screening CfP (Paris 0.2)*, undated, pp. 1-4.

Rohtagi, P., "A Compact and Fast Hybrid Signature Scheme for Multicase Packet Authentication," 6th ACM Conference on Computer and Communications Security, Nov. 1999, pp. 93-100.

Schneider et al., *A Robust Content Based Digital Signature for Image Authentication*, Proceedings of the International Conference on Image Processing, IEEE, Sep. 26, 1996, pp. 227-230.

*SDMI Amendment 1 to SDMI Portable Device Specification*, Part 1, Version 1.0, Sep. 23, 1999, pp. 1-2.

*SDMI Announces Standard for New Portable Devices*, Jun. 28, 1999, pp. 1-2.

*SDMI Anticipated Technical Functionality of Phase 2 Screening of Digital Audio Content*, Dec. 3, 1999, pp. 1-2.

*SDMI Call for Proposals for Phase II Screening Technology*, Version 1.0, Feb. 24, 2000, pp. 1-64.

*SDMI Frequently Asked Questions*, Jul. 13, 1999, pp. 1-4.

*SDMI Guide to the SDMI Portable Device Specification*, Part 1, Version 1.1, undated, pp. 1-5.

*SDMI Identifies Audio Watermark Technology for Next Generation Portable Devices for Digital Music*, Aug. 9, 1999, pp. 1-2.

*SDMI Portable Device Specification*, Part 1, Version 1.0, Jul. 8, 1999, pp. 1-35.

*SDMI Update: Statement from the Executive Director and Portable Working Group Chair*, May 25, 1999, pp. 1-2.

Sherman, Cary, *Secure Digital Music Initiative: Introduction and Objectives*, Recording Industry of America, Feb. 26, 1999, pp. 1-29.

Wong, C.K., et al., "Digital Signatures for Flows and Mutlicasts," Proceedings of IEEE ICNP '98, 1998, 12 pages.

* cited by examiner

| Mark | Result |
|---|---|
| 1202 — Detected | Prevent Copying |
| 1204 — Not Detected | Permit Copying |

Fig. 12A

| Sig.-Containing Mark | Strong Mark | Result |
|---|---|---|
| 1206 — Found & Verified | Don't Care | Permit Copying |
| 1208 — Found & Not Verified | Don't Care | Prevent Copying |
| 1210 — Not Found | Detected | Prevent Copying |
| 1212 — Not Found | Not Detected | Permit Copying |

Fig. 12B

| Signed Hashes | Strong Mark | Result |
|---|---|---|
| 1214 — Obtained & Verified | Don't Care | Permit Copying |
| 1216 — Obtained & Not Verified | Don't Care | Prevent Copying |
| 1218 — Not Obtained | Detected | Prevent Copying |
| 1220 — Not Obtained | Not Detected | Permit Copying |

Fig. 12C

METHODS AND SYSTEMS FOR ENCODING AND PROTECTING DATA USING DIGITAL SIGNATURE AND WATERMARKING TECHNIQUES

RELATED APPLICATIONS

This application is a continuation application of U.S. application Ser. No. 10/897,001, filed Jul. 23, 2004, now U.S. Pat. No. 6,961,854 which is a continuation application of U.S. application No. Ser. 09/588,652, filed Jun. 7, 2000 (now U.S. Pat. No. 6,785,815, issued Aug. 31, 2004), which claims the benefit of priority of U.S. Provisional Patent Application No. 60/138,171, filed Jun. 8, 1999. These applications are hereby incorporated by reference into this application in their entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to systems and methods for protecting data from unauthorized use or modification. More specifically, the present invention relates to systems and methods for using digital signature and watermarking techniques to control access to, and use of, digital or electronic data.

BACKGROUND OF THE INVENTION

Recent advances in electronic communication, storage, and processing technology have led to an increasing demand for digital content. Today large quantities of information can be readily encoded and stored on a variety of compact and easily-transportable media, and can be conveniently accessed using high-speed connections to networks such as the Internet.

However, despite the demand for digital content, and the availability of technology that enables its efficient creation and distribution, the threat of piracy has kept the market for digital goods from reaching its full potential, for while one of the great advantages of digital technology is that it enables information to be perfectly reproduced at little cost, this is also a great threat to the rights and interests of artists, content producers, and other copyright holders who often expend substantial amounts of time and money to create original works. As a result, artists, producers, and copyright owners are often reluctant to distribute their works in electronic form—or are forced to distribute their works at inflated prices to account for piracy—thus limiting the efficiency and proliferation of the market for digital goods, both in terms of the selection of material that is available and the means by which that material is distributed.

Traditional content-distribution techniques offer little protection from piracy. Digitally-encoded songs, movies, and other forms of electronic content are typically distributed to consumers on storage media such as compact disks (CDs) or diskettes. A consumer accesses the data contained on the storage media by e.g., reading the data into the memory of a personal computer (PC) or portable device (PD). Once the data are loaded onto the PC or PD, the consumer can typically save the data to another storage medium (e.g., to the hard disk of the PC) and/or apply compression algorithms to reduce the amount of space the data occupy and the amount of time needed to transfer a copy of the data to another user's computer. Thus, the fact that electronic content is originally stored on a fixed medium such as a CD or diskette typically does little to prevent the unauthorized distribution of the content, as the content can be removed from the storage medium, duplicated, and distributed with relative ease.

Another problem faced by content owners and producers is that of protecting the integrity of their electronic content from unauthorized modification or corruption, as another characteristic of traditional forms of digital content is the ease with which it can be manipulated. For example, once information is loaded onto a user's PC from the fixed storage medium on which it was originally packaged, it can be readily modified and then saved or distributed in modified form.

While increasing attention has been paid to the development of content-management mechanisms that address the problems described above, one obstacle to the adoption of such mechanisms is the reluctance of consumers to embrace new devices or content formats that render their existing devices and content collections obsolete. Thus, there is a need for protection mechanisms that enable new decoding devices to accept previously-encoded content (or content encoded in accordance with other protection schemes), and to also enforce the preferred content protection mechanism when handling content encoded therewith. There is also a need for content protection mechanisms that allow protected content to be played on pre-existing consumer devices, while ensuring that the protection mechanisms will be enforced when protected content is played on devices that recognize the protection mechanisms.

Accordingly, there is a need for systems and methods for protecting electronic content and/or detecting unauthorized use or modification thereof. There is also a need for systems and methods that provide content producers and software and device manufacturers with the flexibility to support a specific protection scheme, but to also support pre-existing or legacy content, content encoded using other security schemes, and/or devices that are not designed to recognize the preferred protection scheme. Moreover, there is a need to accomplish these goals without materially compromising the security that the preferred protection scheme is intended to provide.

SUMMARY OF THE INVENTION

Systems and methods for using digital signature and watermarking techniques to control access to, and use of, electronic data are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

In one embodiment, a method for protecting a digital file against unauthorized modification is disclosed. The file is encoded by inserting a first watermark and multiple signature-containing watermarks into the file, where each signature-containing watermark contains the digital signature of at least a portion of the file. When access to a portion of a file is desired, the file is searched for the watermark that contains the signature for the desired portion of the file. If the signature-containing watermark is found, the digital signature is extracted and used to verify the authenticity of the desired portion of the file. Access to the desired portion of the file is denied if the signature verification process fails. If the signature-containing watermark is not found, the file is checked for the presence of the first watermark. If the first watermark is found, access to the desired portion of the file is inhibited or denied. However, if the first watermark is not found, access to the desired portion of the file is allowed. Thus, the signature-containing watermarks are operable to facilitate detection of modifications to the encoded file, and the first watermark is operable to facilitate the detection of the removal or corruption of the signature-containing watermarks.

In another embodiment, a method is disclosed for controlling access to an electronic file. A hidden code is inserted into the file—via a watermark, for example—and a plurality of modification-detection codes are also inserted, each modification-detection code corresponding to a portion of the file. When access to a portion of the file is desired, the appropriate modification detection code is extracted from the file and used to determine whether the desired portion of the file has been modified. If it is determined that the desired portion of the file has been modified, access to the desired portion is prevented. If the modification detection code corresponding to the desired portion of the file cannot be found, then the file is checked for the presence of the hidden code. If the hidden code is found, access to the desired portion of the file is prohibited; otherwise access is allowed. Thus, the modification-detection codes can be used to detect modifications to the portions of the file to which they correspond, and the hidden code can be used to detect the removal of the modification-detection codes.

In yet another embodiment, a system for providing access to an electronic file is disclosed. The system contains a memory unit for storing portions of the electronic file, a processing unit, and a data retrieval unit for loading a portion of the electronic file into the memory unit. The system also includes a first watermark detection engine for detecting a signature-containing watermark in the electronic file and for retrieving a digital signature associated with the watermark. The system also includes a signature verification engine for verifying the integrity of a portion of the electronic file using a digital signature, and a second watermark detection engine for detecting a strong watermark. The system includes a file handling unit for granting a user access to a desired part of the file upon the successful verification of the part's integrity by the signature verification engine, or upon a failure to detect the signature-containing watermark and a failure to detect the strong watermark.

In another embodiment, a computer program product for controlling access to an electronic file is disclosed. The computer program product includes computer code for searching at least a portion of the electronic file for a first signature-containing watermark. The computer program product further includes computer code for retrieving a digital signature from the first signature-containing watermark, for using the digital signature to verify the authenticity of the portion of the electronic file to which the digital signature corresponds, and for inhibiting the use of the electronic file if verification fails. The computer program product also includes computer code for searching the electronic file for a second watermark if the first signature-containing watermark is not found, computer code for inhibiting use of the electronic file if the second watermark is found, and computer code for permitting use of the electronic file if the second watermark is not found. The computer program product also includes a computer-readable medium for storing the computer codes.

In another embodiment, methods are disclosed for encoding data in a manner designed to facilitate the detection of unauthorized modifications to the data, and for controlling access to the data. First, a strong watermark is inserted into the data. The data are then divided into segments. A first watermarked segment is formed by inserting a first watermark into a segment of the data. The first watermarked segment is then compressed using a predefined compression algorithm, and a copy is decompressed. A signature is formed by encrypting a hash of at least a portion of the decompressed first watermarked segment. Next, a second watermarked segment is generated by inserting a second watermark into a second segment of the data, the second watermark containing the first signature. The second watermarked segment is compressed, decompressed, and signed in the same manner as the first segment was compressed, decompressed, and signed. The signature of the second watermarked segment is then inserted, via a watermark, into a third segment of the data. The process of (a) inserting a signature-containing watermark into a segment of data, (b) compressing and decompressing the watermarked segment, and (c) signing the decompressed watermarked segment is repeated for each of the segments, and the compressed watermarked segments are transmitted to a computer readable storage medium or a decoding device. When access to a portion of the encoded data is desired, the data are decompressed and the signature corresponding to the desired portion of the data is extracted from the appropriate signature-containing watermark. The signature is used to verify the authenticity of the decompressed data. If the signature verification process fails, access to the desired data is inhibited. Otherwise, access is allowed. If the watermark containing the signature for the desired portion of data cannot be found, then the data are checked for the presence of the strong watermark. If the strong watermark is found, access to the desired portion of the data is inhibited; otherwise, access is allowed.

In yet another embodiment, a method for managing at least one use of a file of electronic data is disclosed. Upon receipt of a request to use the file in a predefined manner, the file is searched for a signature-containing watermark. If the signature-containing watermark is found, a digital signature is extracted. The digital signature is used to perform an authenticity check on at least a portion of the file. If the authenticity check is successful, the request to use the file in the predefined manner is granted. If the signature-containing watermark is not found, the file is searched for a strong watermark. If the strong watermark is found, the request to use the file in the predefined manner is denied. If the strong watermark is not found, the request to use the file in the predefined manner is granted.

In another embodiment, a method for managing the use of electronic data is disclosed. Upon receipt of a request to use the electronic data in a certain manner, a file is retrieved that contains one or more check values and a digital signature derived from the check values. The authenticity of the check values is verified using the signature, and the authenticity of at least a portion of the file is verified using the check values. If the file is found to be authentic, the request to use the file is granted.

In another embodiment, a method is provided for managing the use of electronic data. An authentication file is created. The authentication file includes one or more hashes derived from the electronic data, a signature derived from the hashes, and information useful in locating the portion of the electronic data to which each hash corresponds. The authentication file is stored on a networked computer system. When a consumer attempts to use the electronic data in a certain manner—such as copying, moving, viewing, or printing the data—the authentication file is retrieved from the networked computer system and used to verify the authenticity of the electronic data. If the verification is successful, the consumer's request is granted. If the authentication file cannot be found, the electronic data are searched for the presence of a predefined watermark. If the predefined watermark is found, the consumer's request is denied. If the predefined watermark is not found, the consumer's request is granted.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 12A, 12B, and 12C provide a comparison between several content management mechanisms.

DETAILED DESCRIPTION

Figure 1:
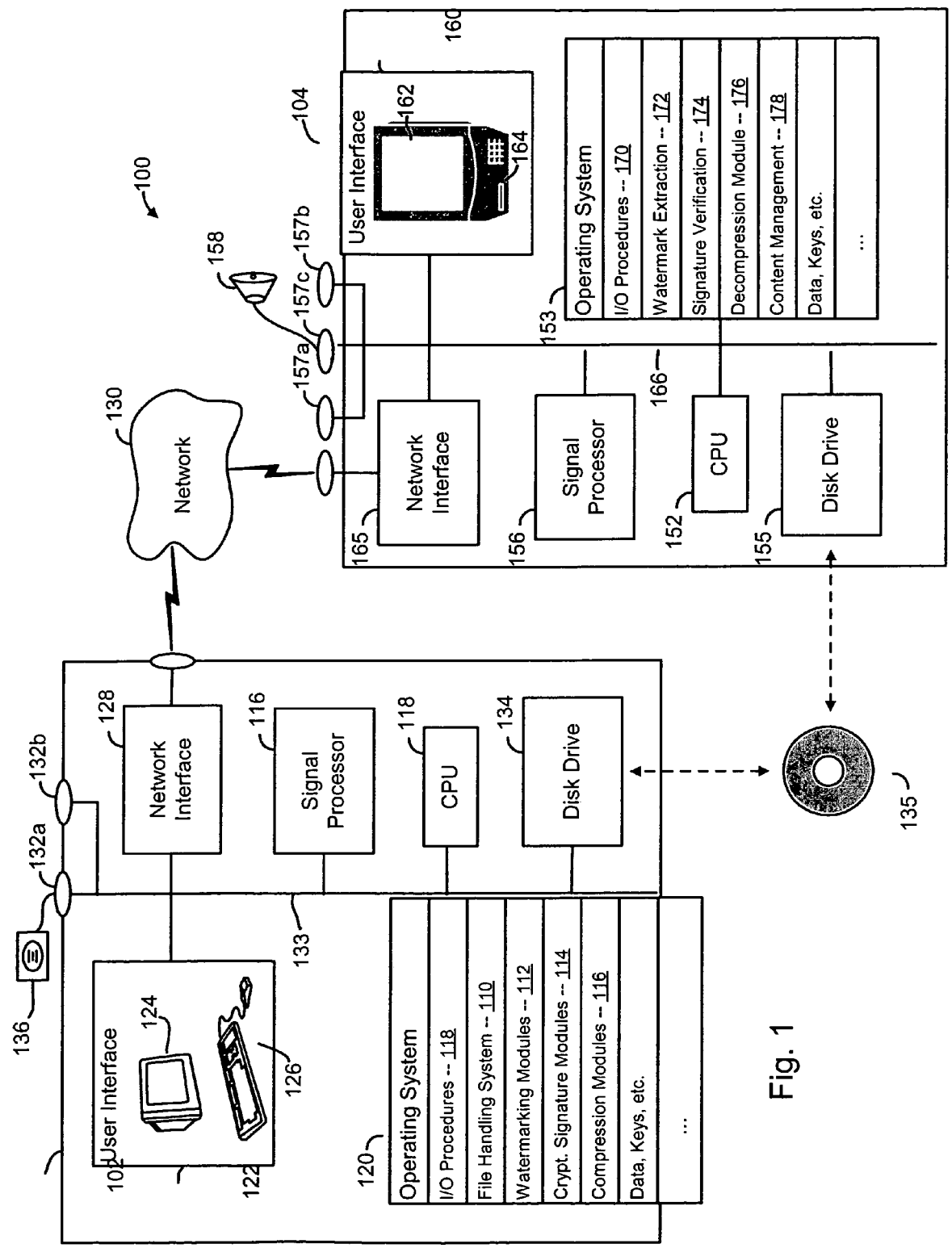
FIG. 1 is an illustration of a system for practicing an embodiment of the present invention.

A detailed description of the invention is provided below. While the invention is described in conjunction with several preferred embodiments, it should be understood that the invention is not limited to any one embodiment. On the contrary, the scope of the invention is limited only by the appended claims, and the invention encompasses numerous alternatives, modifications, and equivalents. For example, while several embodiments are described in the context of a system and method for using watermarks and digital signatures to protect audio signals encoded in Red Book audio and Sony® MiniDisc™ audio disc formats, those skilled in the art will recognize that the disclosed systems and methods are readily adaptable for broader application. For example, without limitation, the present invention can be applied in the context of video, textual, audio-visual, multimedia, or other data or programs encoded in a variety of formats. In addition, while numerous specific details are set forth in the following description in order to provide a thorough understanding of the present invention, it should be appreciated that the present invention may be practiced according to the claims without some or all of these details. Finally, certain technical material that is known in the art has not been described in detail in order to avoid obscuring the present invention.

In the following discussion, content will occasionally be referred to as "registered" or "unregistered." "Registered" content generally denotes content encoded using a predefined encoding scheme—for example, content that includes special codes, signatures, watermarks, or the like that govern the content's use. "Unregistered content," on the other hand, refers to content that does not contain the predefined codes—whether as a result of operations performed on registered content (e.g., removal of specially-inserted watermarks or codes), or by virtue of the fact that the content was never registered in the first place (e.g., content that never contained the special codes, or that contains the codes of another registration format).

The systems and methods described herein enable the protection of content registered in accordance with a predefined encoding scheme, while also allowing secure access to unregistered content. In particular, systems and methods are provided for detecting and preventing access to unauthorized copies of protected content, and for detecting modification to, and/or corruption of, the protected content and the content-management codes it contains. Systems and methods are also provided for permitting the use of content that is not registered in accordance with a given content management or protection system, and for guarding against attempts to circumvent the protection system by modifying registered content to appear as though it had never been registered.

In a preferred embodiment a relatively hard-to-remove, easy-to-detect, strong watermark is inserted in the data signal. The data signal is divided into a sequence of blocks, and a digital signature for each block is embedded in the signal via a comparatively weak watermark. The data signal is then stored and distributed on, e.g., a compact disc, a DVD, or the like. When a user attempts to access or use a portion of the data signal (the data signal having been obtained from a CD, a DVD, the Internet, or other source), the signal is checked for the presence of the watermark containing the digital signature for the desired portion of the signal. If the watermark is found, the digital signature is used to verify the authenticity of the desired portion of the signal. If the watermark is not found or the signature does not confirm the authenticity of the signal, then the signal is checked for the presence of the strong watermark. If the strong watermark is found, further use of the signal is inhibited, as the presence of the strong watermark in combination with the absence or corruption of the signature or signed block provides evidence that the signal has been improperly modified. If, on the other hand, the strong mark is not found, further use of the data signal can be allowed, as the absence of the strong mark indicates that the data signal was never marked or registered with the digital signature. Thus, the present invention is operable to inhibit the use of previously-registered content that has been improperly modified, but to allow the use of content that was not previously registered, such as legacy content or content registered using an alternative encoding scheme.

FIG. 1 illustrates a system 100 for practicing an embodiment of the present invention. As shown in FIG. 1, system 100 preferably includes an encoding system 102, such as a general-purpose computer; a decoding system 104, such as a portable audio or video player, a general-purpose computer, a television set-top box, or other suitable device; and a system for communicating therebetween.

As shown in FIG. 1, in one embodiment encoding system 102 includes:
- a processing unit 118;
- system memory 120, preferably including both high speed random access memory (RAM) and non-volatile memory such as read only memory (ROM) and/or a hard disk for storing system control programs, data, and application programs for encoding data using, e.g., watermarking and/or digital signature techniques;
- one or more input/output devices, including, for example:
  - a network interface 128 for communicating with other systems via a network 130 such as the Internet;
  - I/O ports 132 for connecting to, e.g., portable devices, other computers, microphones, or other peripheral devices;
  - one or more disk drives 134 for reading from, and/or writing to, e.g., diskettes, compact discs, DVDs, Sony® MiniDisc™ audio discs produced by Sony Corporation of Tokyo, Japan and New York, N.Y., and/or other computer readable media;
- a signal processor 116 for receiving a signal from an input device such as microphone 136, and converting the signal to, e.g., a pulse-code modulated (PCM) signal;
- a user interface 122, including a display 124 and one more input devices 126, such as a keyboard and/or a mouse; and
- one or more internal buses 133 for interconnecting the aforementioned elements of the system.

The operation of system 102 is controlled primarily by programs stored in system memory 120 and executed by the system's processing unit 118. These programs preferably include modules for accepting input data signals from, e.g., microphone 136, disc 135, I/O ports 132, and/or other data storage or recording devices. System memory also preferably contains modules for processing the input data signals in accordance with the techniques described herein. For example, system 102 preferably includes modules 110 for dividing or parsing an input data signal into blocks, modules 112 for applying watermark(s) to a data signal, modules 114 for signing data blocks using cryptographic signature algorithms, optional modules 116 for compressing a data signal, and modules 118 for transmitting a data signal to a computer readable medium such as disk 135, or to another system via network 130. Although a software implementation of these modules is shown in FIG. 1, one of ordinary skill in the art will appreciate that some or all of these modules may be implemented in computer hardware or circuitry without departing from the principles of the present invention. Encoding system 102 may also include a secure, tamper-resistant protected processing environment (not shown) and/or modules for associating the data signal with rules and controls which govern its use, as described in commonly-assigned U.S. Pat. No. 5,892,900, entitled "Systems and Methods for Secure Transaction Management and Electronic Rights Protection," issued Apr. 6, 1999 ("the '900 patent"), which is hereby incorporated by reference.

Any suitable system or device can be used for transporting data from encoding system 102 to decoding system 104, including a digital or analog network 130 such as the Internet, the manual transportation of a magnetic or optical disc 135 from one system to another, or any combination of these or other suitable communication or transmission techniques.

Decoding system 104 is operable to decode signals encoded by system 102, to apply security transformations to those signals, and to output the decoded signals to a user in accordance with the results of the security transformations. As described in more detail below, decoding device 104 is preferably operable to accept data that are properly registered and data that were never registered, while rejecting registered data that have been improperly modified and unregistered data that have been modified to appear as though it were registered. In one illustrative embodiment decoding system 104 includes:
- a processing unit 152;
- system memory 153, preferably including a combination of both RAM and ROM for storing system control programs, data, and application programs for, e.g., applying security transformations to a data signal. System memory 153 may also include removable non-volatile memory such as a flash memory card;
- a disk drive 155 for reading from, and/or writing to, magnetic and/or optical storage media such as diskettes, CDs, DVDs, MiniDisc™ audio discs, and/or other storage media;
- a network interface 165 for communicating with other systems via a network 130 such as the Internet;
- a signal processor 156 for, e.g., converting digital signals into analog form;
- one or more input/output ports 157 such as Universal Serial Bus (USB) port 157a, speaker jack 157b, and infrared port 157c for receiving signals from, and transmitting signals to, external devices such as encoding system 102, speaker 158, display 162, disk drive 155, and the like;

a user interface 160, including a display 162 and one more input devices such as control panel 164; and one or more internal buses 166 for interconnecting the aforementioned elements of the system.

The operation of decoding system 104 is controlled primarily by programs stored in system memory 153 and executed by the system's processing unit 152. These programs preferably include modules for obtaining a data signal and for processing it in accordance with the techniques described herein. For example, system 104 preferably includes modules 170 for receiving and parsing an encoded data signal, modules 172 for detecting and extracting watermarks contained in the data signal, modules 174 for verifying the authenticity of cryptographic signatures contained in or associated with the signal, and optional modules 176 for decompressing compressed data signals. Decoding system 104 also preferably includes modules 178 for controlling use of decoded data signals (e.g., controlling transmission of data to system memory 153, disk 135, display 162, or to other systems via network 130) in accordance with the output of watermark detection/extraction modules 172, signature verification modules 174, and/or in accordance with other rules or controls associated with the data signal or the system. In a preferred embodiment modules 172, 174, 176, and 178 are implemented in firmware stored in the ROM of decoding device 104 along with certain data and cryptographic keys used by the modules. However, one of ordinary skill in the art will appreciate that some or all of these modules may be readily implemented in computer hardware or circuitry without departing from the principles of the present invention. Decoding system 104 may also include a protected processing environment (not shown) for storing sensitive data and keys. For example, a protected processing environment such as that described in the '900 patent (previously incorporated by reference herein) could be used.

As described above, it is desirable to prevent attackers from copying a digital file from a storage medium such as a compact disc and distributing unauthorized copies to others. One obstacle to this type of attack is the fact that the audio and video files contained on CDs and DVDs are typically quite large, and can thus be impractical to transmit in their original form. As a result, attackers often employ compression techniques to reduce content files to a fraction of their original size, thus enabling copies to be transmitted over networks such as the Internet with relative ease, and to be efficiently stored on the limited and/or relatively expensive memory of personal computers and portable devices. Many popular compression technologies, such as MP3, are able to achieve high compression ratios by removing information from the original content file. As a result, when a compressed file is decompressed it will often be slightly different from the original version of the file, although compression technologies are typically designed to minimize the impact these differences have on a user's perception of signal quality. However, detection of these differences can enable the detection of piracy, as distributors of illegal copies typically compress content before distributing it.

In addition to preventing attackers from distributing unauthorized copies of a digital work, it is also desirable to preserve the security of digital files by detecting unauthorized modifications. For example, if a content file contains special codes indicating that the content can only be used on a specific device, or that the content cannot be compressed, copied, or transmitted, an attacker may attempt to remove those codes in order to make unauthorized use of the content. Similarly, an attacker may attempt to add special codes to an unprotected piece of content in order to use the content on a device that checks for the presence of these codes as a precondition for granting access to the content or for performing certain actions (e.g., accessing the content more than a certain number of times, printing a copy of the content, saving the content to a memory device, etc.).

For example, a CD may contain a variety of separate tracks and/or features. Some tracks or features may be encoded with a protection scheme (as described in more detail below) that prevents unauthorized copies and/or modified versions of the content from being played on supported devices, but does not otherwise modify the content, thus allowing it to be played on pre-existing or other devices that do not support the protection mechanism. Other tracks on the CD can be encoded in such a manner that they can only be played on devices or systems that include appropriate decoding software or hardware, thus encouraging users to purchase devices and/or software that supports the preferred content protection mechanism.

Watermark/Signature Modification Detection Mechanism

In a preferred embodiment the detection of unauthorized, lossy compression and/or other modifications to a data signal is facilitated by inserting a mark into the signal that is relatively difficult to introduce, yet relatively easy to extract by a decoding device 104. Such a mark may be inserted by an encoding system 102 operated by, e.g., the content creator, the content distributor, and/or a third party placed in charge of securing content on behalf of its owners. The integrity of the inserted mark is preferably easily corrupted if any transformation is applied to the data signal. That is, the mark is preferably chosen such that modifications to the content file will corrupt the mark and/or change a predefined relationship between the mark and the file, thereby enabling the mark to serve as a means of verifying the authenticity of the file's content. Thus, use of such a mark facilitates the detection of unauthorized copies of a file, since unauthorized copies are often made using lossy compression schemes such as MP3 which modify the file.

Figure 2A:
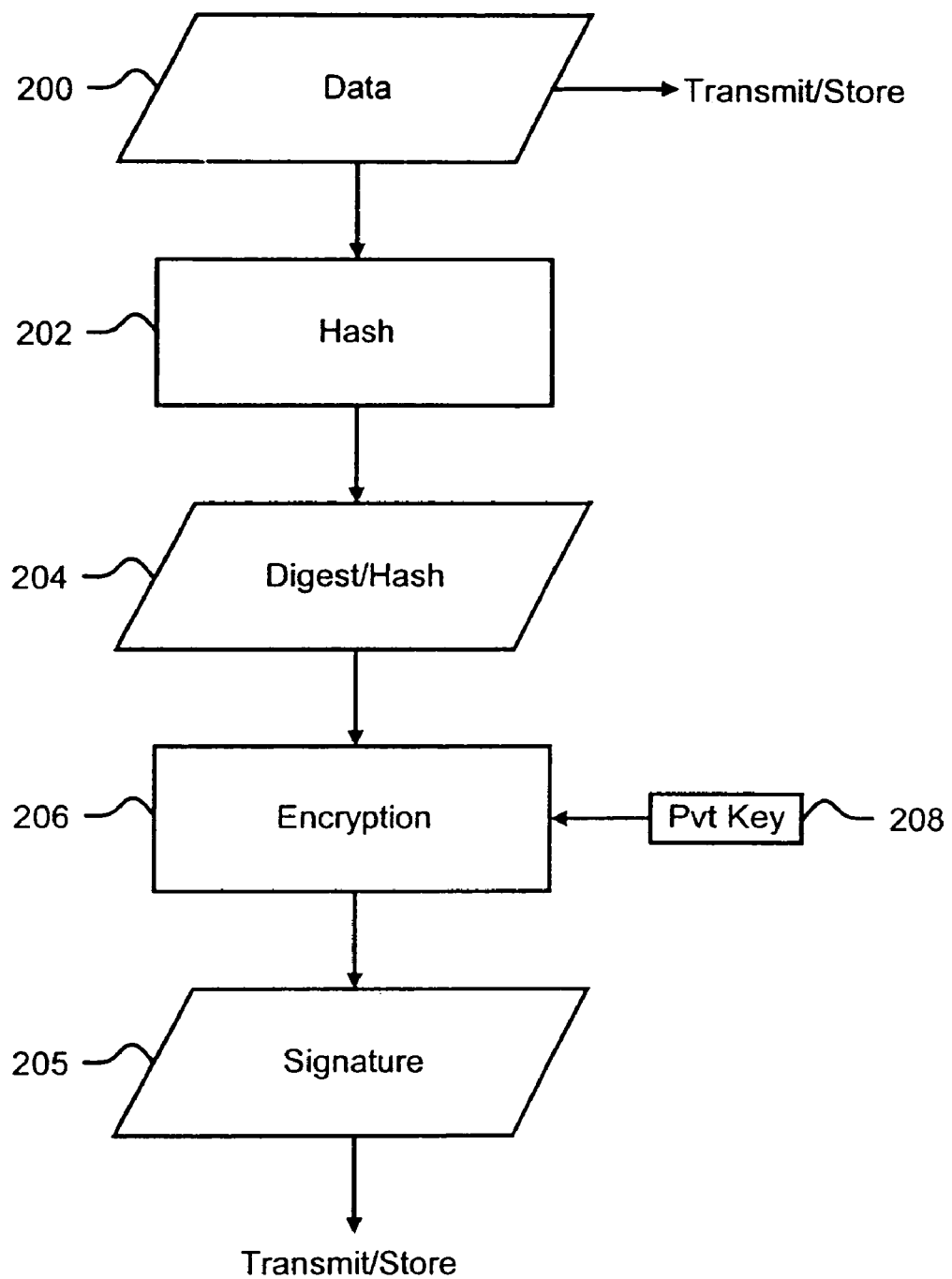
FIGS. 2A and 2B illustrate techniques for generating a cryptographic signature and using the signature to verify the authenticity of the data to which the signature corresponds.
Figure 2B:
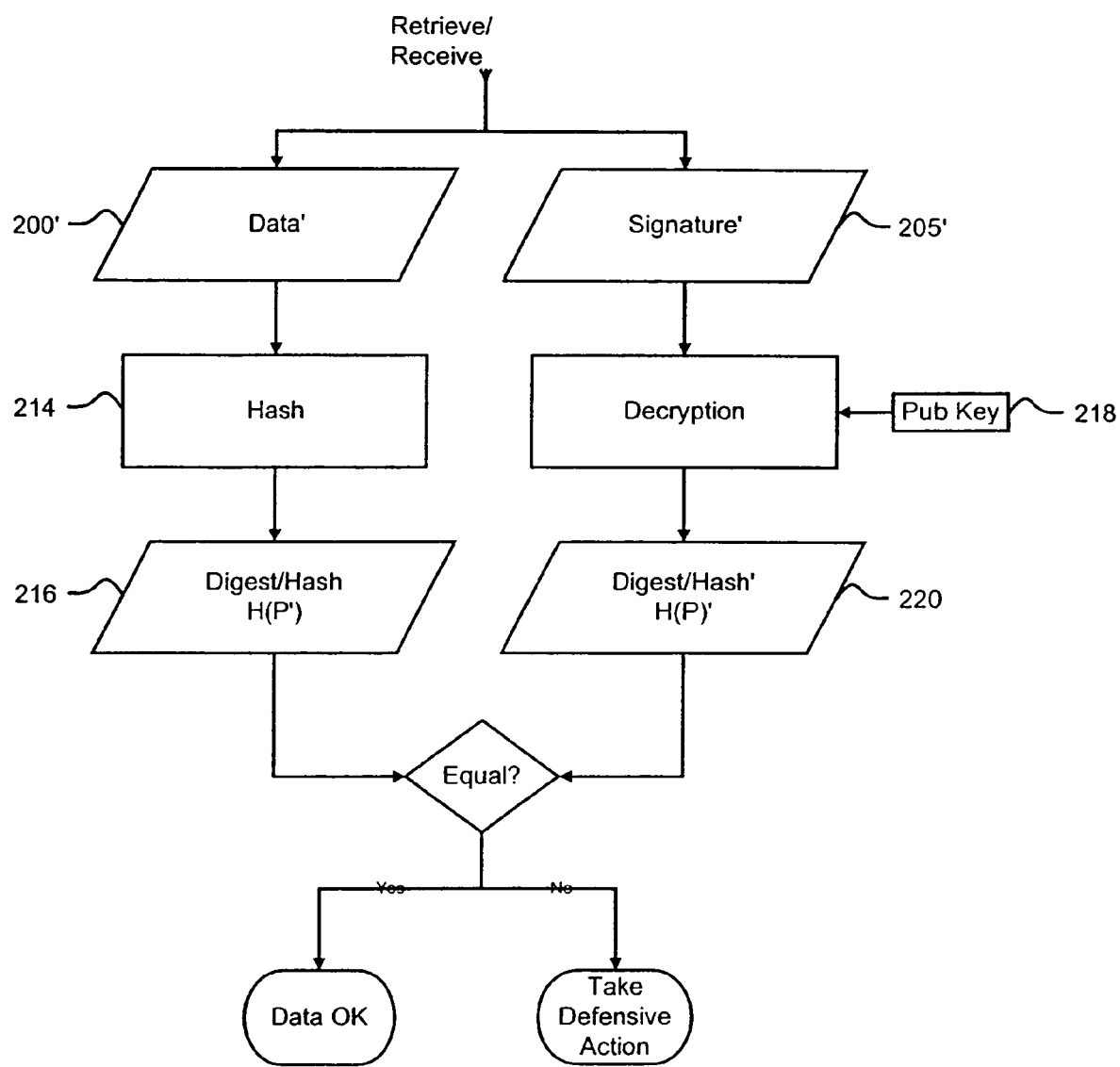

In a preferred embodiment the above-described mark comprises a digital signature. An exemplary technique for applying a digital signature to a block of data is shown in FIGS. 2A and 2B. Referring to FIG. 2A, encoding system 102 creates a signature 205 by (i) applying a strong cryptographic hash algorithm 202 (e.g., SHA-1) to a block of data 200, and (ii) encrypting the resulting message digest 204 with the encoding system's private key 208. In other embodiments the message digest is encrypted (and decrypted) using a secret key that is shared between the encoding and decoding systems.

Referring to FIG. 2B, upon receiving a block of data 200' and a corresponding signature 205', decoding system 204 applies hash function 214 to the received data to yield message digest 216. Decoding system 204 also decrypts signature 205' using the sender's public key 218 (or a shared secret key, as appropriate) to yield message digest 220. Message digest 216 is then compared with message digest 220. If the two message digests are equal, the recipient can be confident (within the security bounds of the signature, scheme) that data 200' are authentic, as any change an attacker made to data 200 or to signature 205 would cause the comparison to fail. While a digital signature technique such as that shown in FIGS. 2A and 2B is used in one preferred embodiment, in other embodiments other signature and/or marking techniques may be used.

Since knowledge of the signing key is generally sufficient to enable the production of registered material, it is desirable to protect the signing key against attack. Physical attacks can generally be avoided by placing the key in a single protected environment; for example, at a content certification authority. To protect against cryptographic attacks, any of the well-known and reliable public key technologies may be used. For example, in one embodiment an RSA algorithm is used with a relatively large key (e.g., between 2048 and 4096 bits), although it will be understood that other algorithms and/or key sizes could be used instead.

Problems may arise if conventional signature techniques are applied to data stored on magnetic or optical storage media, to streaming data, or to data received from electronic communications networks such as the Internet. For example, data retrieved from CDs, DVDs, MiniDisc audio discs, hard disks, and the like will often contain relatively short, random, burst errors which can cause a signature to fail even in the absence of malicious tampering, as signatures are generally quite sensitive to errors or variations in the data upon which they are based. In addition, computing a single signature for a large file such as an audio track or a movie can require a relatively large amount of computing resources, which may not be available on a consumer's decoding/playing device. Moreover, with regard to streaming data, it will typically be undesirable and/or impractical for the decoding device to wait for an entire file to be received before verifying the file's authenticity and releasing it for use, as consumers will often be unwilling to wait for the entire file to be received, and decoding devices will often lack enough memory to store the entire file. The present invention provides systems and methods that can be used to overcome some or all of these limitations without materially compromising the security offered by the signature scheme.

Figure 3:
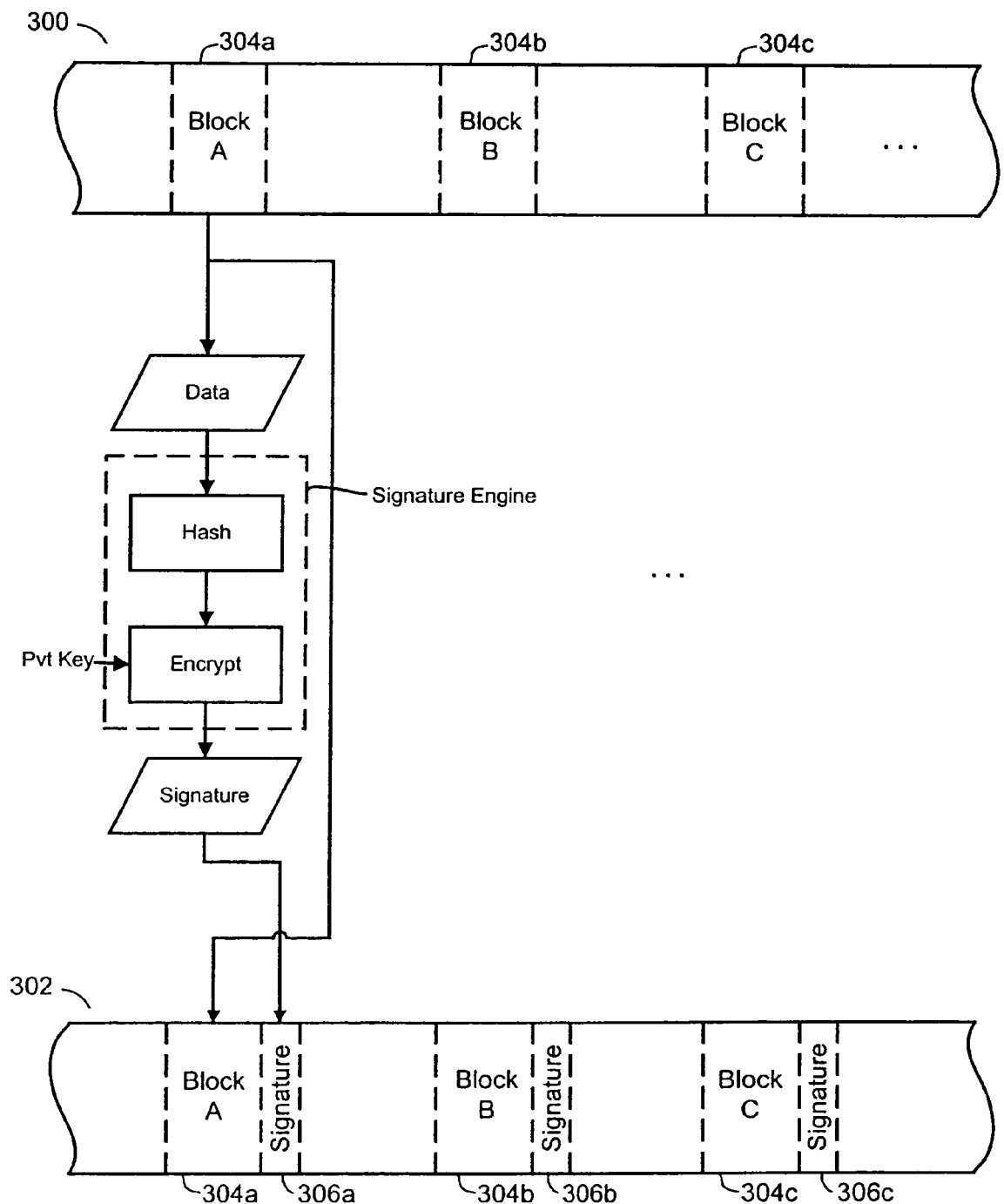
FIG. 3 is an illustration of a technique for verifying the integrity of a data signal using cryptographic signatures.

FIG. 3 illustrates a technique for applying digital signatures to a data signal 300. Data signal 300 may, for example, represent PCM data from an audio track on a compact disc or a MiniDisc audio disc, video data from a DVD, a stream of textual information received from the Internet, part of a computer program or applet, or any other suitable data signal. As shown in FIG. 3, one approach to signing data signal 300 is to logically and/or physically partition data signal 300 into a sequence of data blocks or segments 304, each segment 304 having its own signature 306. When decoding system 104 receives the encoded data signal 302, system 104 verifies the authenticity of blocks 304 using, e.g., the techniques previously described in connection with FIG. 2B. In a preferred embodiment the size of blocks 304 is made small enough to minimize the likelihood that random burst errors in the data signal will occur in more than a predefined fraction of the blocks, yet large enough to ensure that the signature 306 associated with each block 304 is relatively difficult to crack and/or remove from the signal without degradation. One of ordinary skill in the art will appreciate that optimal choices for the block size and the signature size will typically depend on the application, and can be readily determined empirically.

A problem with the approach shown in FIG. 3, however, is that when signatures 306 are inserted into data signal 300, they can produce undesirable degradation of the signal. For example, if the data signal represents an audio file, the signature blocks can produce an audible hissing noise when the file is played. Since signal quality is usually the primary concern of a user, this type of degradation should be avoided. While reducing the size of signatures 306 will typically lessen the signal degradation, it also reduces the security offered by the signature scheme. Moreover, while it is possible (as in one embodiment) to design a decoding device 104 that it is operable to remove the signatures from the data signal before the data signal is output, consumers may be reluctant to purchase content that can only be played on such a device.

Figure 4A:
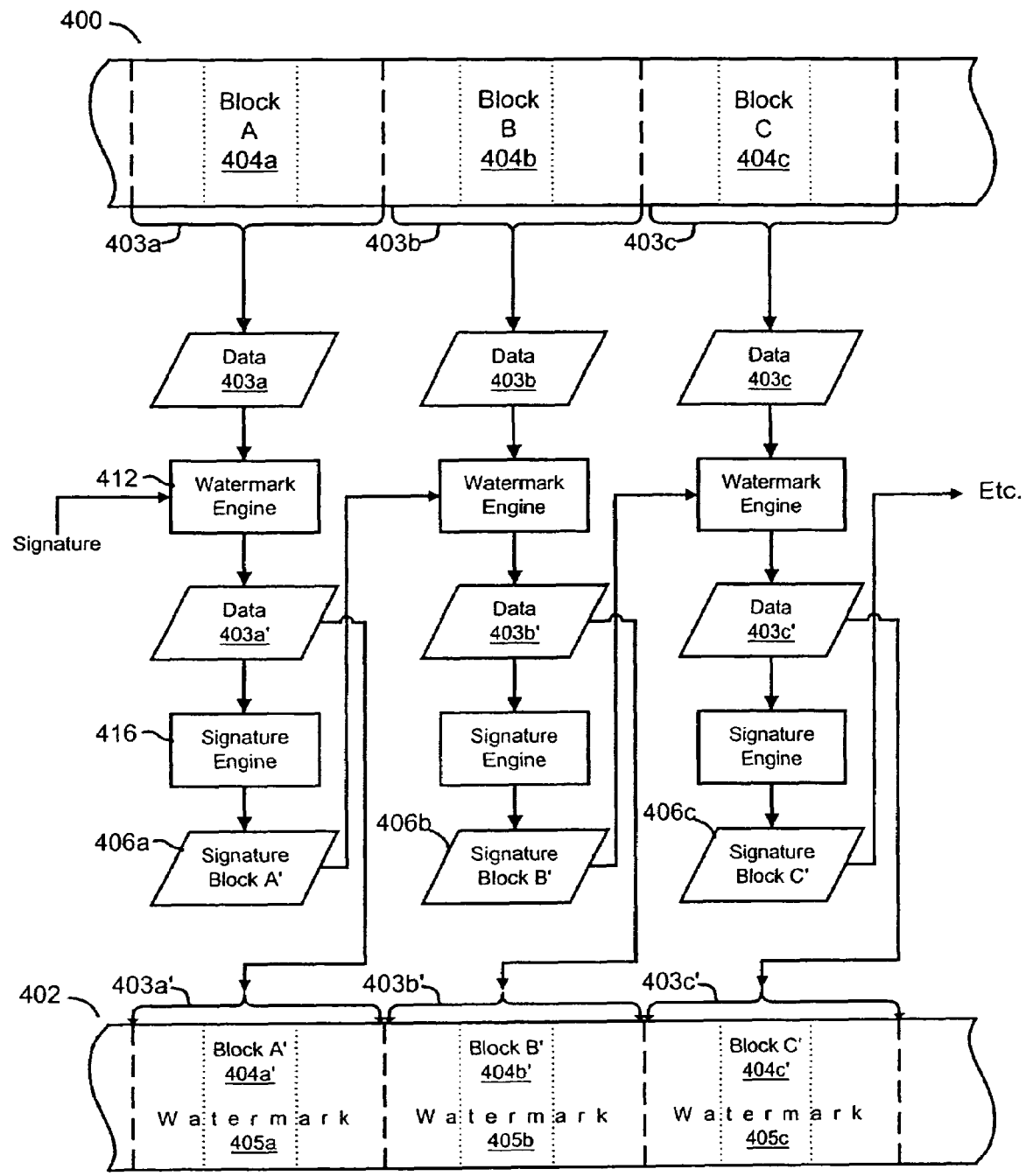
FIG. 4A illustrates a technique for encoding a data signal using cryptographic signatures and watermarks in accordance with an embodiment of the present invention.

As shown in FIG. 4A, these problems are alleviated in one embodiment of the present invention through the use of a watermarking technique. Referring to FIG. 4A, the signature 406 for each block 404 of data signal 400 is embedded in encoded data signal 402 using a watermark 405. By embedding signatures 406 in this manner, unacceptable degradation of signal 400 can be substantially avoided.

In general terms, watermarking involves the insertion of additional data into a signal in such a manner that the signal appears unchanged (at least upon casual inspection). It should be appreciated that any suitable watermarking and/or steganographic technique may be used in accordance with the principles of the present invention. Techniques for watermarking various types of signals (e.g., audio, visual, textual, etc.) are well-known in the art, and watermarking technology is readily-available from a variety of companies such as Fraunhofer IIS-A of Am Weichselgarten, 3 D-91058 Erlangen, Germany, and Verance Corporation of 6256 Greenwich Drive, Suite 500, San Diego, Calif. (formerly ARIS Technologies, Inc.). Additional exemplary watermarking and steganographic techniques are described in commonly-assigned U.S. Pat. No. 5,943,422, entitled "Steganographic Techniques for Securely Delivering Electronic Digital Rights Management Control Information Over Insecure Communication Channels," and Proceedings of the IEEE, "Identification & Protection of Multimedia Information," pp. 1062–1207 (July 1999), each of which is hereby incorporated by reference.

An obstacle to embedding digital signatures in a data signal via a watermark is that the very process of embedding the signatures is likely to change the signal somewhat, thus rendering the signatures ineffective in verifying the signal's authenticity. System designers are thus faced with an apparent catch-22: a signature will correspond to the signal as it existed before the signature was embedded, but the system designer will want to verify the authenticity of the signal as it exists after the signature has been embedded.

The present invention provides systems and methods for overcoming the problem described above. Specifically, as shown in FIG. 4A, in a preferred embodiment the signature for a given portion of data 404 is included in the watermark for the following block 403 (e.g., the signature 406a for signature block 404a is embedded in block 403b via watermark 405b). As a result, the signature for a given block 404(n) can be used to verify the authenticity of the preceding block 404(n−1), including the watermark/signature embedded within that block. Although for purposes of illustration FIG. 4A depicts a signature 406 being computed for a portion 404 of a larger block 403, it will be appreciated that signature 406 could instead be computed for the entire block 403 or any suitable portion thereof without departing from the principles of the present invention.

Figure 4B:
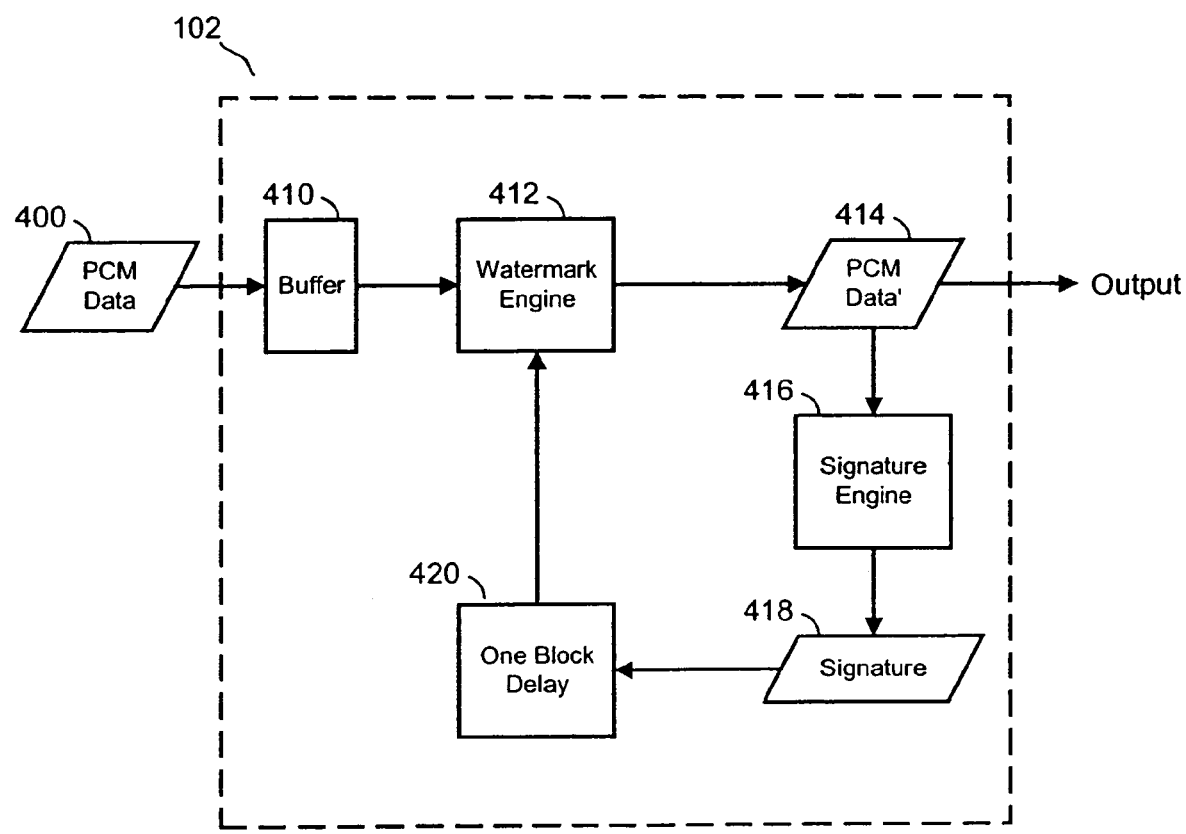
FIG. 4B illustrates a system for encoding a data signal using cryptographic signatures and watermarks in accordance with an embodiment of the present invention.

FIG. 4B illustrates the operation of encoding system 102 in an embodiment that performs the techniques described in connection with FIG. 4A. Referring to FIG. 4B, encoding system 102 is operable to watermark a first portion of a PCM signal 400 with a digital signature 418 corresponding to a second portion of the PCM signal 400. Incoming PCM data are stored in an input buffer 410. When a predetermined amount of data (e.g., a block) has accumulated in input buffer 410, the data are sent to mark-injection engine 412, which inserts a watermark in the data to yield watermarked PCM data 414. Watermarked PCM data 414 may then be sent to, e.g., a user, a disk, or some other suitable destination, while a copy of data 414 is sent to signature engine 416. Signature engine 416 is operable to create a signature 418 corresponding to watermarked PCM data 414. Signature 418 is then sent to a latch or delay element 420. Delay element 420 stores signature 418 until the next block of incoming PCM data is ready to be sent to watermarking engine 412, at which point signature 418 is retrieved from delay element 420 for use by watermarking engine 412. Thus, the signature 418 of all or part of the watermarked version of a given block of PCM data is included in the watermark of the following block in the signal.

The process shown in FIGS. 4A and 4B can be repeated for each block of data in the data signal 400, the result being a data signal 402 containing a succession of blocks, each block being watermarked with the signature of a portion of the block just ahead of it in the transmission stream. Thus, the present invention is advantageously able to provide the security of digital signatures without unduly degrading the quality of the data signal. Note that the first block of data that is transmitted will typically not contain a signature. However, in one embodiment the first block may contain the signature or hash of certain metadata about the file. For example, if the file is an audio track, the first block may contain a watermark that includes a signature or hash relating to the name of the track, the name of the track's producer, and/or other desired information. Note, too, that there will typically not be a signature that corresponds to the last block of data in the stream, since there is not a block of data that follows the last block into which the signature can be embedded. Alternatively, a final block that includes the signature for the last data block can also be transmitted.

While the embodiments illustrated in FIGS. 4A and 4B insert the signature for a given block into the following block in the data signal, one of ordinary skill in the art will appreciate that the signature could be readily inserted at other locations in the data signal, instead. For example, if the data signal is preprocessed and/or appropriately buffered (as opposed to being encoded and stored or transmitted on-the-fly), the signature for a given block of data may be inserted in a preceding block in the encoded data signal. It should also be appreciated that the signature for a given block need not be placed in an adjacent block.

The performance of the above-described scheme can typically be enhanced by choosing the size of the block 404 that is to be signed so that it is much smaller than the size of the watermark block 403. However, signature blocks 404, and the frequency with which they appear in the signal 402, are preferably large enough that if an attacker were to replace or remove a signed block, the quality of the data signal would be perceptibly degraded (e.g., in the case of an audio file, an audible hissing might be heard when the modified file was played). In one illustrative encoding of an audio signal, a signature block of 64 kilobytes (i.e., 0.36 seconds of PCM data) and a watermark block of between 176 kilobytes and 882 kilobytes (i.e. 1 to 5 seconds) are used, where the PCM signal consists of two channels of 16-bit samples taken 44,100 times per second.

Figure 5A:
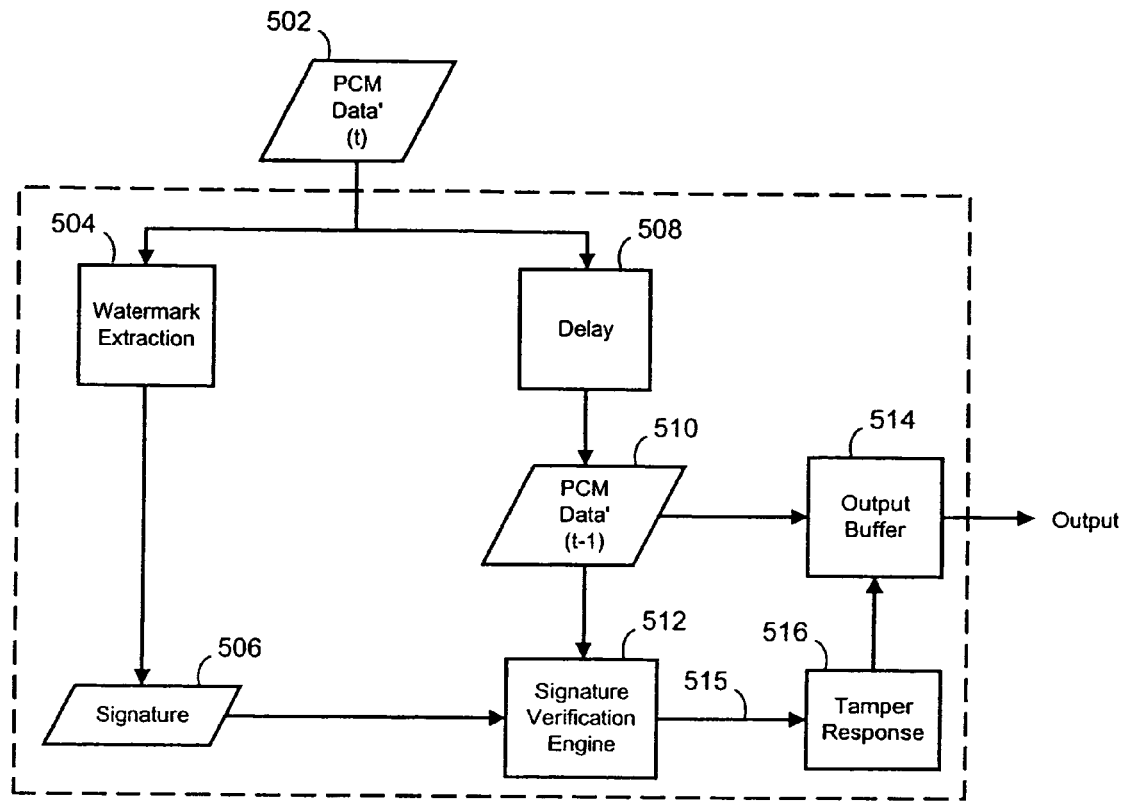
FIG. 5A is an illustration of a system for decoding a data signal in accordance with an embodiment of the present invention.

FIG. 5A illustrates the operation of an embodiment of decoding system 104 upon receipt of a signal encoded in the manner described in connection with FIGS. 4A and 4B. Referring to FIG. 5A, decoding device 104 is configured to decode an input data signal—such as that obtained from a CD 135 inserted into disk drive 155, or that obtained from network 130 via network interface 165—and to either inhibit or allow the use of the data signal depending on the results of the decoding process. Incoming blocks of data 502 are stored in buffer/delay element 508, and an embedded signature 506 is extracted from a watermark in each block 502 by mark-extraction engine 504. The signature 506 that is extracted from a given block (e.g., a block 502 received at time t), is provided to signature verification engine 512, which is operable to verify the authenticity of the previously-received block to which the signature 506 corresponds (e.g., a block 510 received at time t−1). The output 515 of signature verification engine 512—indicating whether block 510 was modified or signature 506 was corrupted—is used to control the release of block 510 and/or the initiation of an appropriate defensive response if modification is detected. Released content may, for example, be sent directly to an output device, such as speaker 158, display 162, disk 135, or the like; and/or may be sent to memory 153 for storage pending authentication of additional portions of the signal.

Figure 5B:
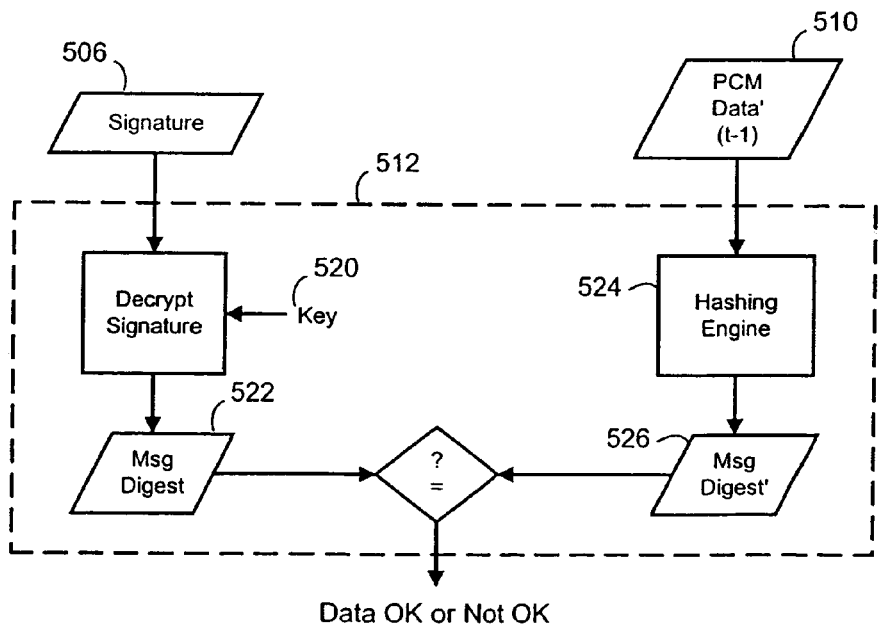
FIG. 5B shows an illustrative embodiment of a signature verification engine in accordance with an embodiment of the present invention.

FIG. 5B provides a more detailed illustration of the operation of an embodiment of signature verification engine 512. As shown in FIG. 5B, signature verification engine 512 is operable to accept a signature 506 and a block of data 510, and to use signature 506 to evaluate the authenticity of block 510. Specifically, signature 506 is decrypted using, e.g., a public key 520 (or secret key as appropriate) to yield a message digest 522. Similarly, a message digest 526 is derived from input data 510 by hashing engine 524. The two message digests are compared, and, if they are equal, block 510 is deemed authentic; if the two message digests are not equal, appropriate defensive action can be taken. Thus, in order for an attacker to make compressed or otherwise modified content pass this verification test, the attacker will generally need to reproduce the originally-encoded data signal, which will typically be impractical.

For purposes of practicing the present invention, any suitable response may be taken upon detection of unauthentic data by signature verification engine 512. For example, in one embodiment further receipt and/or use of the data signal is terminated, degraded, and/or hampered in some other manner. In some embodiments notification that an error (or a certain level of errors) has been detected may also be sent via network interface 165 to another system, such as encoding system 102. Tamper response logic 516 may also store data in system memory 153 indicating that an error has been detected.

In some embodiments signals containing a certain amount, percentage, or pattern of unauthentic data blocks are allowed to be used without triggering additional defensive mechanisms. This can be especially useful when dealing with signals that suffer from burst errors, as these errors typically do not evidence an intent to tamper with the signal. With real devices, it has been found that only a relatively small percentage of the signed blocks are affected by such errors. Thus, to avoid mistaken rejection of content, a threshold can be used for signature or hash acceptance, the threshold being based on the number or percentage of good (or bad) blocks detected. In one embodiment only those signals that contain at least a predefined number or percentage of good blocks per unit are accepted. For example, a group of blocks may be accepted only if at least 80% of the blocks obtained during an, e.g., 15 second period are valid, regardless of whether errors cause signature or hash verification to fail for the remaining 20% of the blocks.

In order to process watermarked/signed data in the manner described above, decoding engine 104 is operable to detect block boundaries so that it can locate the watermarks and signatures. For purposes of practicing the present invention the detection of block boundaries can be accomplished using any suitable technique, such as the auto-synchronization techniques used by conventional watermarking algorithms. However, because PCM data signals typically do not include synchronization information (apart from the fact that each PCM sample starts on a double byte boundary) in one embodiment the task of detecting signature blocks is simplified by including a "guess" (or "hint") in each watermark, the guess enabling the signature-verifying engine to find the signed blocks more easily. In a preferred embodiment the guess comprises an easy-to-compute representative value—such as the logical exclusive-or (XOR)—of the signed block or a portion thereof. This optimization allows the verification system to avoid hashing all possible signature blocks in the watermark block to look for a possible match. In addition, as shown in FIG. 4A, in a preferred embodiment only one block of data 404 is signed per watermark block 403, and the signed block 404 is localized within the watermark block 403.

Figures 6A, 6B:
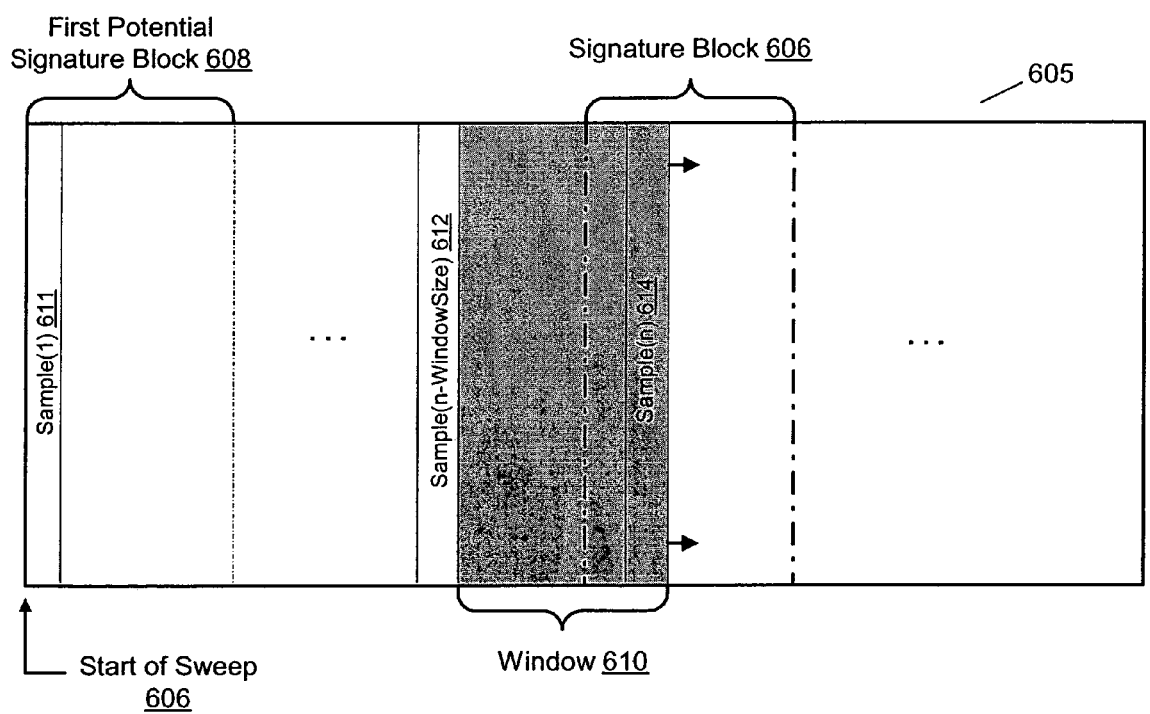
FIGS. 6A, 6B, and 6C illustrate techniques for locating signature blocks in an encoded data signal in accordance with the principles of the present invention.

In one embodiment the guess comprises a 16-bit exclusive-or (XOR) of the PCM samples contained in the signature block. That is, the guess comprises the running bitwise-XOR of all of the samples in the signature block. For purposes of illustration, FIG. 6A shows an 8-bit "running bitwise XOR" computed in this manner. It should be appreciated, however, that any suitable technique can be used to compute the guess, and the guess can comprise any suitable number of bits. For example, the "window" of PCM samples used to compute the guess need not be the same size as the signature block, although smaller windows may result in a greater number of false positives (i.e., matches with other groups of samples besides the signature block). Moreover, while in one embodiment a running XOR is used, as it is easy to compute on the fly, one of ordinary skill in the art will recognize that other transformations could be used instead. For example, transforms that are characterized by the following relationship typically make good candidates for computing the guess:

$A[TRANSFORM]B=X$; and $A[TRANSFORM']X=B$

Thus, it will be appreciated that any suitable technique for generating the guess can be used without departing from the principles of the present invention, the primary purpose of the guess simply being to facilitate location of the signature block.

Once the guess has been calculated, it is inserted into the data signal by the watermarking engine of encoding system 102. Since the guess typically contains less information about the block than the signature itself, it generally does not provide additional security, and thus need not be signed. Decoding system 104 is operable to retrieve the watermarks from the data signal—each watermark containing a signature and a guess that can be used to locate the data block to which the signature corresponds.

Figure 6C:
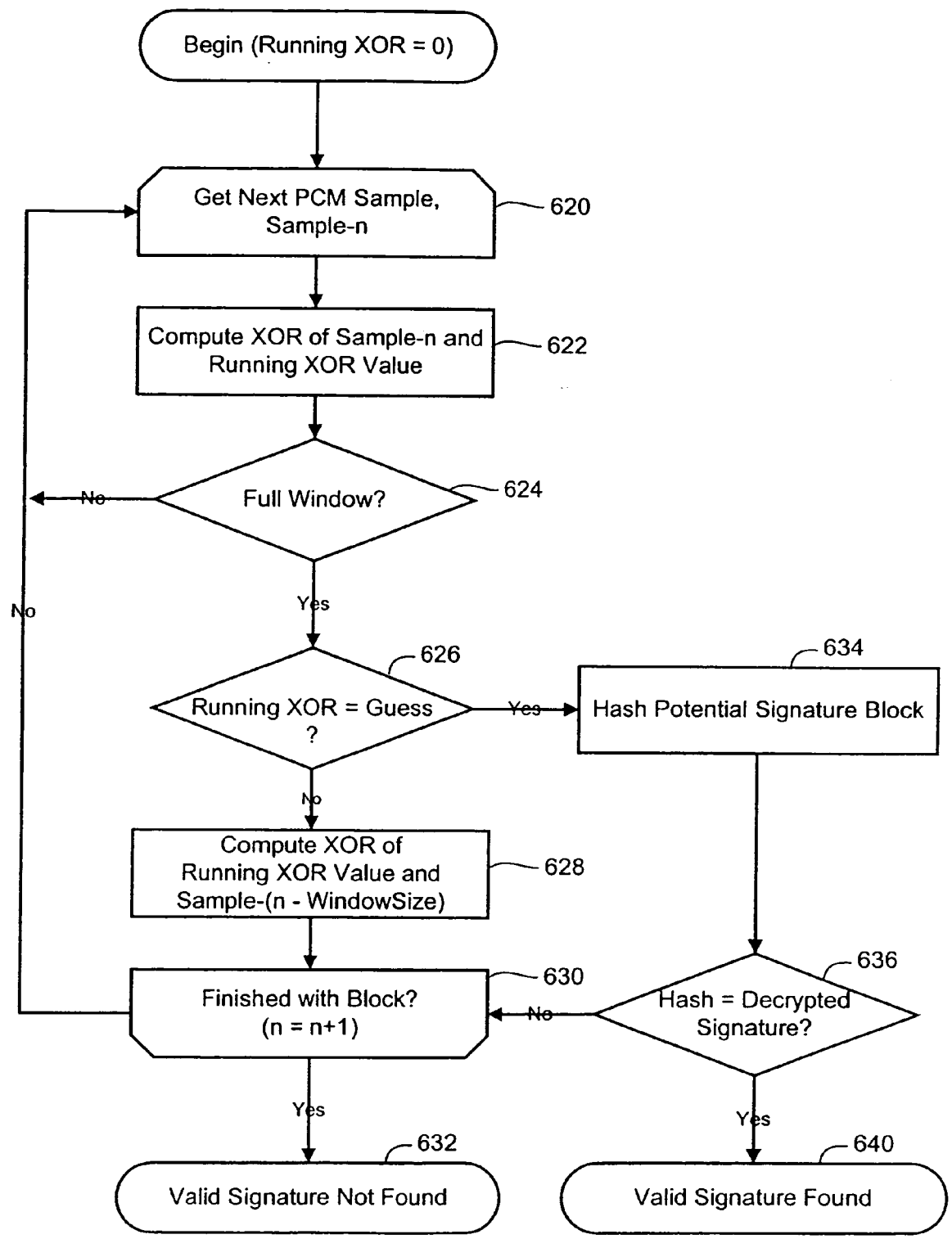

FIGS. 6B and 6C illustrates how the guess can be used to locate a signature block. As shown in FIG. 6B, in one embodiment the signature block is located by sweeping a window 610 across the previously-received watermark block (or some other suitably large portion of received data, so as to ensure that the swept portion is likely to include the signature block) and calculating the XOR of the samples in the window in the same manner used to calculate the guess. When a location is found at which the window's XOR value equals the guess, the decoding system's signature verification engine proceeds with verifying the signature against the windowed block in the manner described above in connection with FIG. 5B.

The dynamic computation requirements of computing the XOR of each window are relatively low, as the XOR from the previous window can simply be XOR'd with the value of the sample 612 that was removed from the window when the window was moved to its new position, and the result can then be XOR'd with the value of the sample 614 that was added to the window.

FIG. 6C is a flow chart that further illustrates the signature-block-location process described above. Referring to FIG. 6C, the XOR value of the first potential signature block (i.e., block 608 in FIG. 6B) is computed by XORing successive PCM samples for an initial segment of data (620–624). Once enough samples have been XOR'd (i.e., a "yes" exit from block 624), the running XOR for the first potential signature block is compared with the guess (626). If the two values are equal (i.e., a "yes" exit from block 626), the hash of the potential signature block is calculated (634) and compared with the decrypted signature (636). If the hash matches the decrypted signature (i.e., a "yes" exit from block 636), then a valid signature has been found (640); otherwise, the search for a valid signature resumes (630) and/or appropriate defensive action is taken. If, on the other hand, the XOR for a given window is not equal to the guess (i.e., a "no" exit from block 626), then the window is moved forward one sample and the value of the running XOR for the new window is computed (628, 630, 620, 622). This process is repeated until the signature block is found. If the signature block is not located within a predefined portion of data (e.g., the watermark block), then decoding system 104 notes that a valid signature was not found (632) and takes appropriate responsive action (e.g., terminates further access to the file, displays an error message, checks for other watermarks as described below, or simply records the result).

Figure 7A:
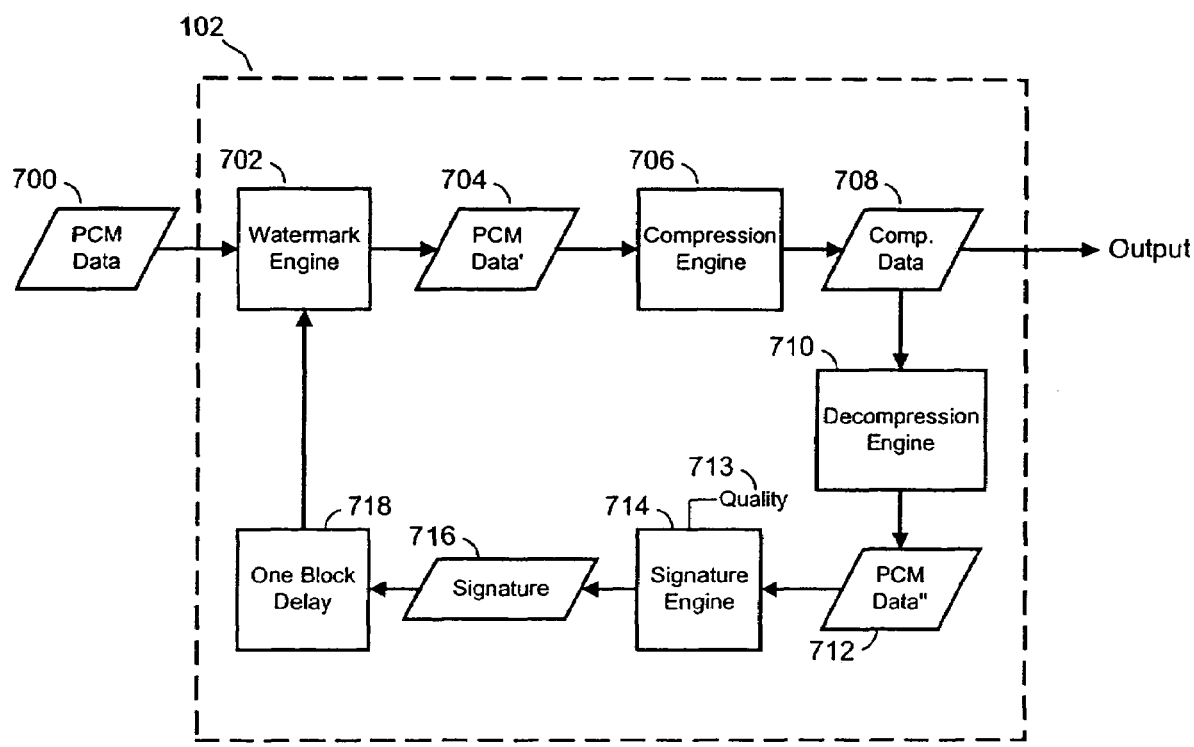
FIG. 7A illustrates a system for encoding compressed data in a manner designed to facilitate authentication of the data in accordance with an embodiment of the present invention.

A modification to the embodiments described above will generally be needed to support authorized, lossy-compression of a signal (e.g., as with signals encoded and distributed in MiniDisc format). FIG. 7A illustrates an exemplary solution, which can be implemented by modifying the system shown in FIG. 4B. Referring to FIG. 7A, PCM data 700 are input to encoding system 102. Encoding system 102 includes a watermarking engine 702 for inserting a watermark to form watermarked PCM data 704. Watermarked PCM data 704 are sent to compression engine 706, which compresses the data using the authorized compression technique. For example, use might be made of a compression scheme such as MPEG-2 AAC; the ATRAC and ATRAC3 compression technologies developed by Sony Corporation; the AC-3 algorithm developed by Dolby Laboratories, Inc., of 100 Potrero Avenue, San Francisco, Calif. 94103-4813; the Windows® Media Audio format developed by Microsoft Corporation, of One Microsoft Way, Redmond, Wash. 98052-6399, or any other suitable compression technique. Compressed data 708 are then output by encoding system 102 (e.g., transmitted to storage or to a decoding system 104), while a copy of compressed data 708 is sent to decompression engine 710.

Decompression engine 710 reverses the compression process, yielding decompressed PCM data 712. That is, decompression engine 710 emulates the decompression employed by decoding system 104. If the compression performed by compression engine 706 (and the decompression performed by engine 710) is lossless, then decompressed data 712 will be the same as watermarked PCM data 704. However, if compression is lossy, this will typically not be the case. Decompressed data 712 are sent to signature engine 714, which generates a digital signature 716 corresponding to the data. Signature 716 is then sent to a delay block (e.g., a latch or buffer), where it waits until the next block of PCM data is ready to be watermarked, at which point signature 716 is inserted into the PCM data block by watermark engine 702. As one of ordinary skill in the art will appreciate, one or more buffers (not shown) can also be inserted between the various other blocks of FIG. 7A in order to ensure proper timing of the data flow through the system.

Thus, the system shown in FIG. 7A, like the system shown in FIG. 4B, is able to use digital signatures to achieve a high level of security without unacceptably degrading signal quality. Moreover, as shown in FIG. 7A, these goals can be achieved even when lossy compression is applied to the input signal. Specifically, by decompressing compressed data 708 before generating signature 716, encoding system 102 ensures that signature 716 will correspond to the decompressed data block 712 that a decoding system obtains after decompressing block 708. Thus, the system shown in FIG. 7A enables detection of unauthorized compression, which will often employ a different compression algorithm (e.g., MP3) than the authorized compression algorithm used by decoding system 102 (e.g., a proprietary compression algorithm).

A signal that is encoded in the manner shown in FIG. 7A can be decoded simply by decompressing the encoded, compressed signal and applying the decoding techniques described above in connection with FIG. 5A. Because watermarking algorithms typically incorporate some redundancy and error correction capability, the original watermark can be recovered even after undergoing compression.

Another obstacle to the use of authorized compression techniques by encoding system 102 is that decompression engines are typically not completely deterministic (i.e., decompressing a compressed signal will generally not yield the same result each time). In this regard, it has been observed that some decompression engines effectively assign random values to the least significant bits of the decompressed signal. Thus, even if the techniques described in connection with FIG. 7A are used, the signature for a given block may fail to verify. In order to account for this, in one embodiment the watermark also includes a two-bit field containing information about the reliability of the signal's least significant bits. The two-bit field indicates how many PCM sample bits should be included in the signal for purposes of computing the signature. Bits not included in the signal are assumed to be zero. As shown in FIG. 7A, this quality indicator 713 is input to signature engine 714, and the signature is computed accordingly. Note that quality indicator 713 need not be signed along with the signal, as it is generally not possible to mount an attack by changing these bits, since signature verification will fail if these bits do not reflect the values actually used in computing the signature. The signature engine of decoding device 104 is operable to retrieve the quality indicator from the watermark, and to use it in computing the signature of the received data signal.

Figure 7B:
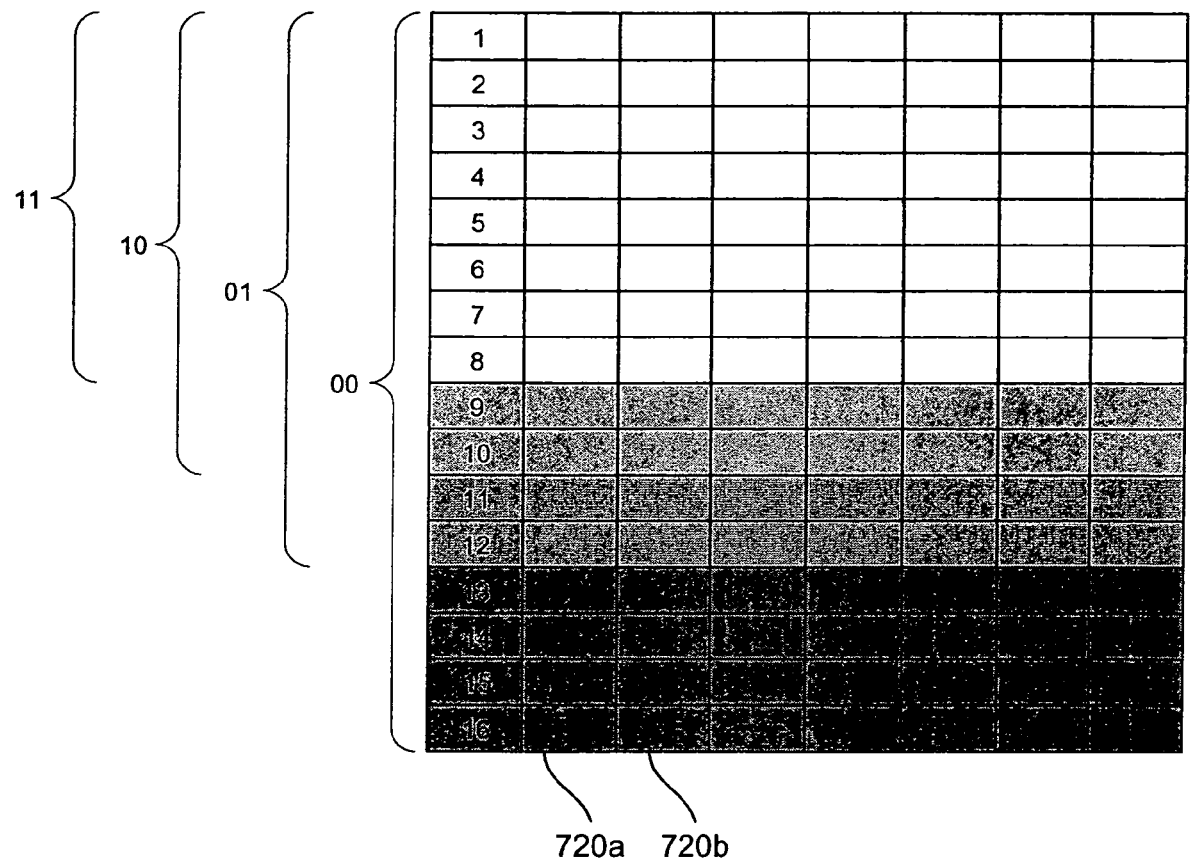
FIG. 7B illustrates an encoding scheme designed to facilitate authentication of a data signal in accordance with an embodiment of the present invention.

As shown in FIG. 7B, an illustrative encoding of this two-bit signal is:
- 00: All 16 bits of each PCM word 720 are relevant (e.g., Red Book CDs);
- 01: Only the 12 most significant bits of each PCM word 720 are relevant;
- 10: Only the 10 most significant bits are relevant;
- 11: Only the 8 most significant bits are relevant.

One of ordinary skill in the art will appreciate that the number of bits appropriate for a particular compression algorithm can be readily determined empirically. It should also be appreciated that in some embodiments the quality indicator may consist of a different number of bits (e.g., 3 bits, 1 bit, etc.) in order to provide higher (or lower) resolution.

A technological constraint on the techniques described above is that conventional watermarking algorithms generally cannot transport large amounts of data In this regard, it should be noted that if each of the items set forth above is included in the watermark for each block, each watermark will contain almost 261 bytes of data (e.g., a two-bit quality indicator, a four-byte guess, and a 2048-bit signature). This a relatively large amount of data for a watermarking algorithm to handle with current technology. Although simply reducing the size of the payload will alleviate this problem, it will also tend to reduce the security and/or efficiency of the system. Another way to alleviate this problem is to make the watermarking block bigger, thus allowing the payload to be distributed over a larger portion of the data signal. However, this approach also tends to reduce the security of the system, as it reduces the frequency at which signed blocks appear in the signal.

Figure 8:
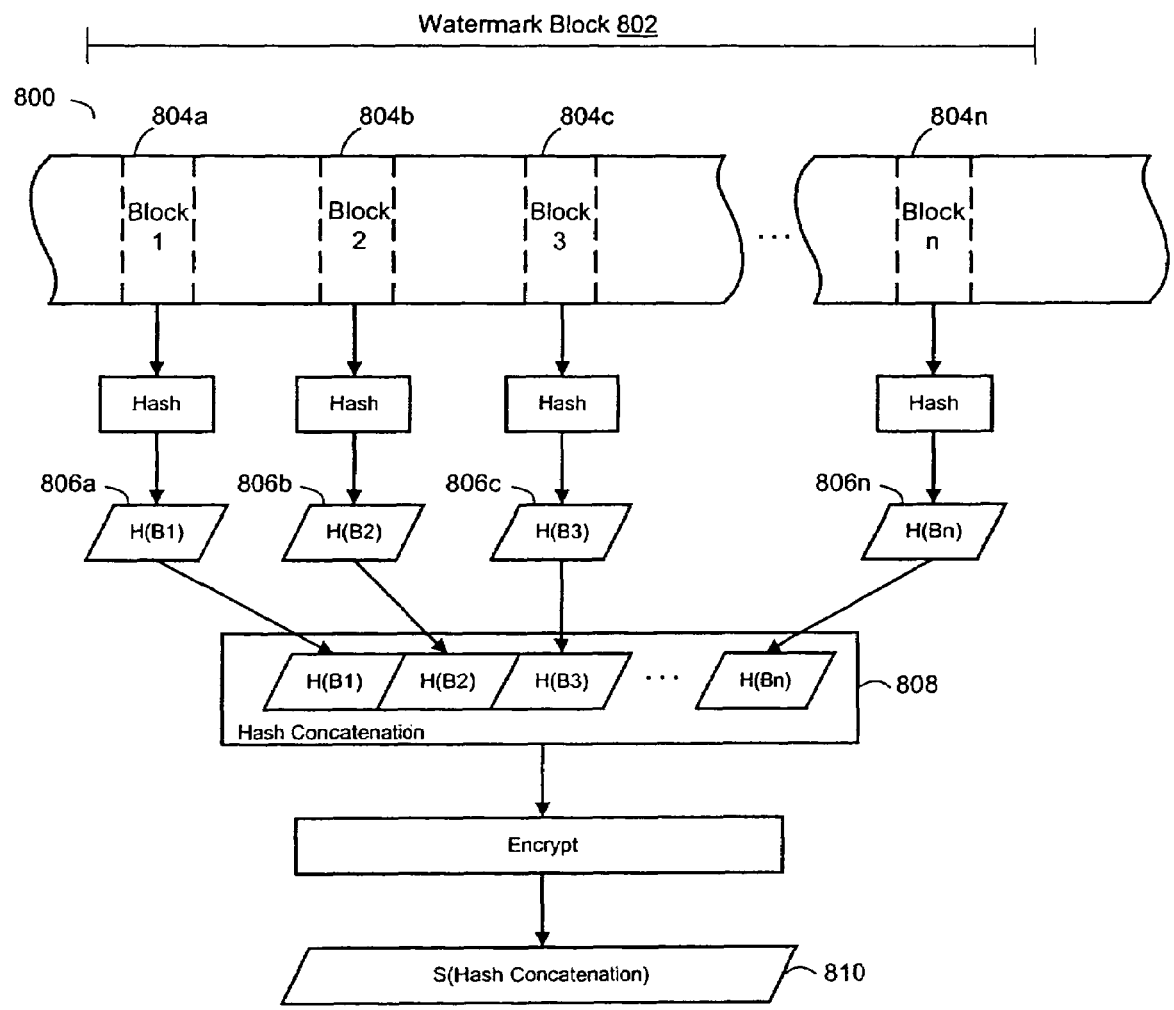
FIG. 8 illustrates a shared signature scheme in accordance with an embodiment of the present invention.

Thus, in one embodiment a novel error-recoverable shared signature scheme is used. As described below, this signature scheme is resistant to errors in the signed data, and yet is generally as robust as a conventional signature scheme. An implementation of this technique is illustrated in FIG. 8. As shown in FIG. 8, portions 802 of a data signal 800 are partitioned into multiple sub-blocks 804. Each sub-block 804 is hashed, and the hashes 806 are concatenated. The concatenation of hashes 808 is encrypted, and the resulting signature 810 is embedded in the next watermark block of the signal, as previously described. In one embodiment the signed blocks 804 are 64 kilobytes. Thus, although the signature 810 remains 256 bytes (and the watermark payload remains approximately 261 bytes), the signature and other payload items are now spread over a much larger amount of data (e.g., 15–30 seconds of data, instead of 1–5 seconds) than they would if each signature block 804 in data signal 800 had its own watermark.

Decoding system 104 retrieves the signature from the watermark in the manner previously described. The signature is decrypted to yield hash concatenation 808, and the hash values 806 in hash concatenation 808 are used to verify the authenticity of the corresponding blocks 804 in the data signal.

Since secure hashes generally behave as random data, this solution is believed to be as secure as techniques which pad a single hash. If an error appears in one of the data partitions 804, signature 810 will still verify for all partitions 804 except for the one that is affected. Moreover, such errors can be readily detected and handled. The appropriate number of correct blocks to obtain in order to decide that the signature is correct can be determined in a straightforward manner using statistical analysis of the quality of the PCM signal for the given application.

In one embodiment the signed blocks 804 within a given watermark block 802 are spread substantially equally, and thus it is typically only necessary to find one such block in order to localize the rest. However, care should be taken in using the guess field, as failure to find the first signature block 804 can lead to failure to find the rest of the blocks in the hash concatenation, thus causing signature verification to fail. Accordingly, in one embodiment a guess for more than one block is included in the watermark. The optimal number of guesses for a given application can be readily determined empirically by examining, e.g., signal quality. The optimal number of blocks to be included in each signature will typically depend on the final key size and the hashing algorithm that is used (since the maximum size of the hash concatenation will typically correspond to the size of the key, and the size of each hash will determine how many hashes can fit in such a concatenation). As an example, in one embodiment the SHA1 or RIPEMD160 hashing algorithms are used with 2048 bit encryption keys, and 12 hash blocks are included in each signature (i.e., 2048 bits per key/128 bits per hash=12 hashes).

Multi-level Protection

In systems that allow the use of pre-existing content (e.g., legacy content and/or content encoded using other protection schemes), it is desirable to detect an attacker's attempt to make registered content appear as if it were pre-existing content in order to hide the fact that the registered content is being used without authorization or has been modified in some other manner. For example, an attacker may attempt to remove the watermarks and/or signatures associated with a protected file. In one embodiment this attack is countered through the use of a hard-to-remove, easy-to-retrieve, low-bit-rate watermark. For example, a single bit of information can be encoded in the signal in such a way that it cannot be easily removed. This watermark is preferably applied to registered content before introduction of the relatively weak signature-containing watermarks described above. Thus, if an attacker is able to successfully remove the weak watermark and signature, the strong watermark will remain, and will serve as an indication that the data have been tampered with. Since the strong watermark need not contain any information (just its presence is important), it will typically be difficult for an attacker to detect or remove.

Strong watermarking techniques are well-known in the art, and for purposes of practicing the present invention any suitable technique can be used to implement the strong watermark, including, for example, the commercially-available watermarking technology developed by Fraunhofer IIS-A, Verance Corporation, or others. In the context of audio data, for example, one way to introduce such a mark is via sound subtraction. This process makes use of the fact that subtracting pieces of sound from an audio signal is generally less perceptible to a listener than adding sounds to the signal. In one embodiment the mark insertion procedure consists of deleting some parts of the signal in the frequency domain. The parts to be deleted (i.e., the deletion pattern) are preferably selected so that the user's subjective listening experience is not materially affected. For example, this can be done using well-known psycho-acoustical or perceptual modeling techniques. In a preferred embodiment the deletion pattern is chosen in a manner similar to that used by the first step of many well-known lossy-compression algorithms, such as MP3 and/or AAC. Collusion with existing lossy-compression algorithms can be avoided by using a slightly different pattern than, or a superset of the patterns used by, these algorithms.

Detecting the strong mark involves detecting the gaps in the signal, and can be performed using well-known filtering techniques. Due to listeners' sensitivity to sound addition, it will typically be infeasible for an attacker to refill the deleted gaps of the signal above a given threshold without introducing perceptible disturbances in the signal. In a preferred embodiment the gap detection threshold is set above this audibility threshold, such that filling in the gaps to prevent detection of the strong mark will result in undesirable degradation of the audible signal.

Another technique for implementing the strong watermark makes use of a keyed, watermarking algorithm. Keyed watermarking algorithms typically include two steps:

1. Detection of places in the signal where a mark can be inserted. Mark-holder candidates are typically identified by analyzing one or more signal characteristics, such as the audible signal degradation that a given modification will introduce, or the probability that the mark contained in a given mark holder will be destroyed by an attack. The set of potential mark-holders is typically quite large.
2. Insertion of the mark in a subset of the mark-holder candidates. The mark is inserted into a subset of the mark-holder candidates using a key, knowledge of the key generally being necessary to find the selected mark holders and retrieve their payload. Typically each of the mark-holders contains a subpart of the payload. This subpart is generally not locally-coded in an error resistant-fashion, as it is too small. To provide error detection and recovery, several mark-holders generally will contain the same part of the payload.

Figure 9A:
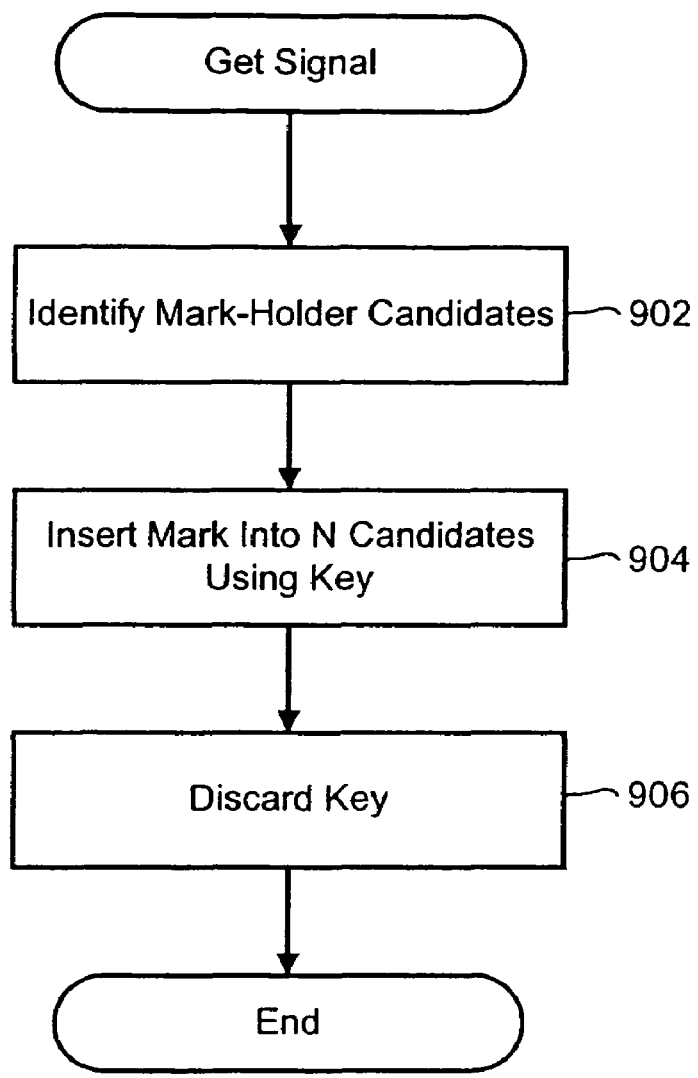
FIG. 9A illustrates a technique for inserting a strong watermark in a data signal in accordance with an embodiment of the present invention.

FIG. 9A illustrates the use of a keyed watermarking algorithm to implement the strong mark described above. Referring to FIG. 9A, a predefined payload is inserted into the signal using, e.g., a standard keyed watermarking algorithm (902, 904). Once the watermark has been inserted, the key is discarded or stored in a secure location (906). The watermarking algorithm is tuned empirically such that a statistically significant mark hit rate can be obtained even if an incorrect key is used to retrieve the mark. Although this will typically not enable direct retrieval of the payload from each of the mark holders, the hit rate (i.e., the number of payload-containing mark candidates divided by the total number of candidates that are examined) will be significant enough to allow a decision to be made as to whether the signal was watermarked, which is sufficient for purposes of implementing the strong mark described above.

Figure 9B:
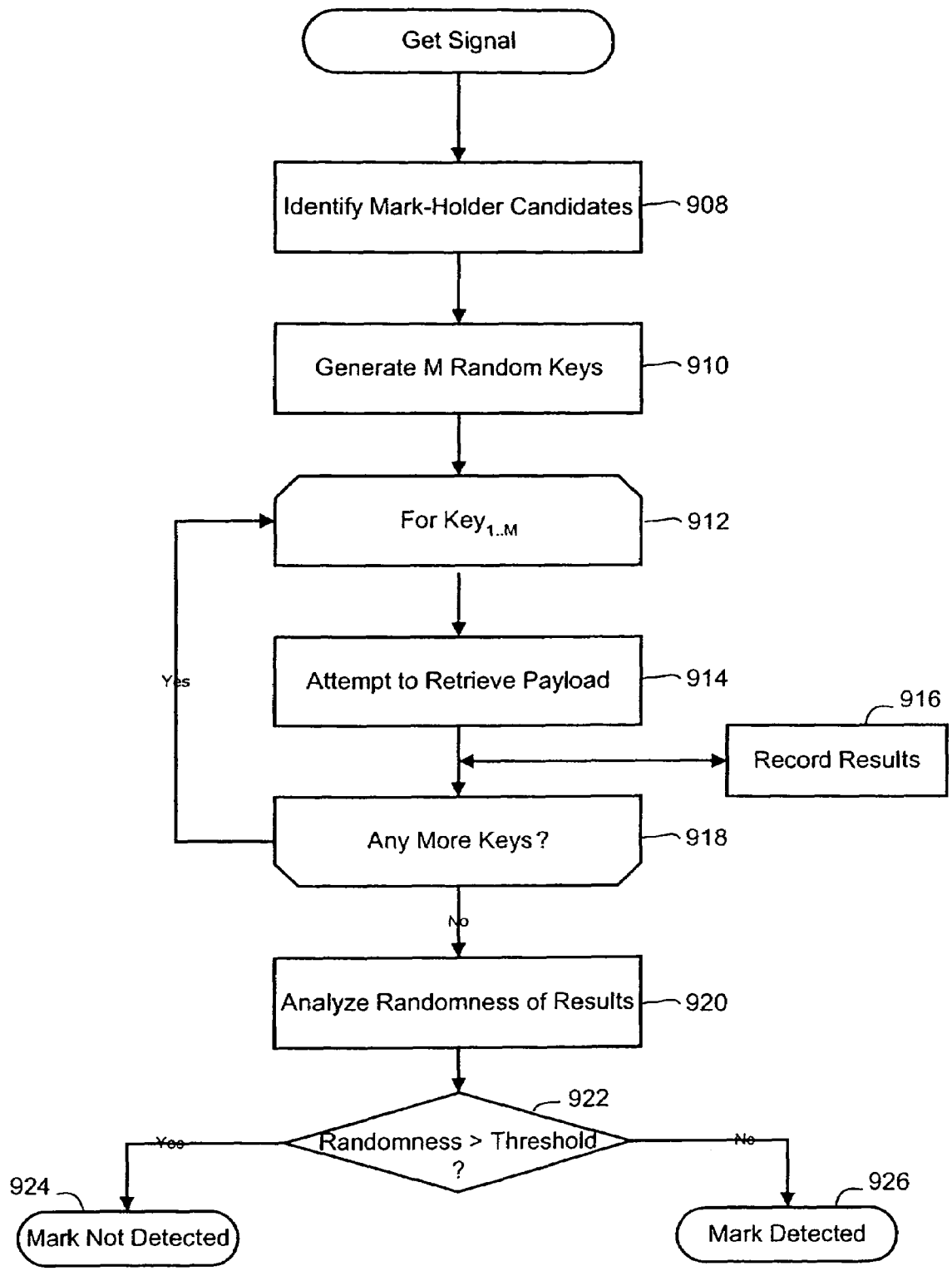
FIG. 9B illustrates a technique for detecting the presence of a strong watermark in accordance with an embodiment of the present invention.

FIG. 9B provides a more detailed illustration of a technique for detecting a strong-watermark inserted in the manner described in connection with FIG. 9A. Referring to FIG. 9B, a set of random keys is generated for use in retrieving the payload inserted by the keyed watermark algorithm (910). Each one of the keys is used to retrieve a "payload," which will generally not be the same as the payload inserted at block 904 of FIG. 9A since the random key used to retrieve the payload will typically not be the same as the key used to insert the payload (912–918). The results of the retrieval process are stored (916), and once each key has been used, the retrieved "payloads" are statistically analyzed for randomness (920). If the randomness level is less than a predefined threshold (922) (the threshold typically being determined during the tuning process described above), the signal is deemed to contain the strong watermark (926).

Since the identity of the actual mark-holders is unknown, as is the identity of the sub-set of mark holders examined by the watermark verifier, it will be difficult for an attacker to destroy the watermark, as that will generally entail the modification of all of the potential mark-holders candidates in the set, which will typically degrade signal quality unacceptably.

Figure 10:
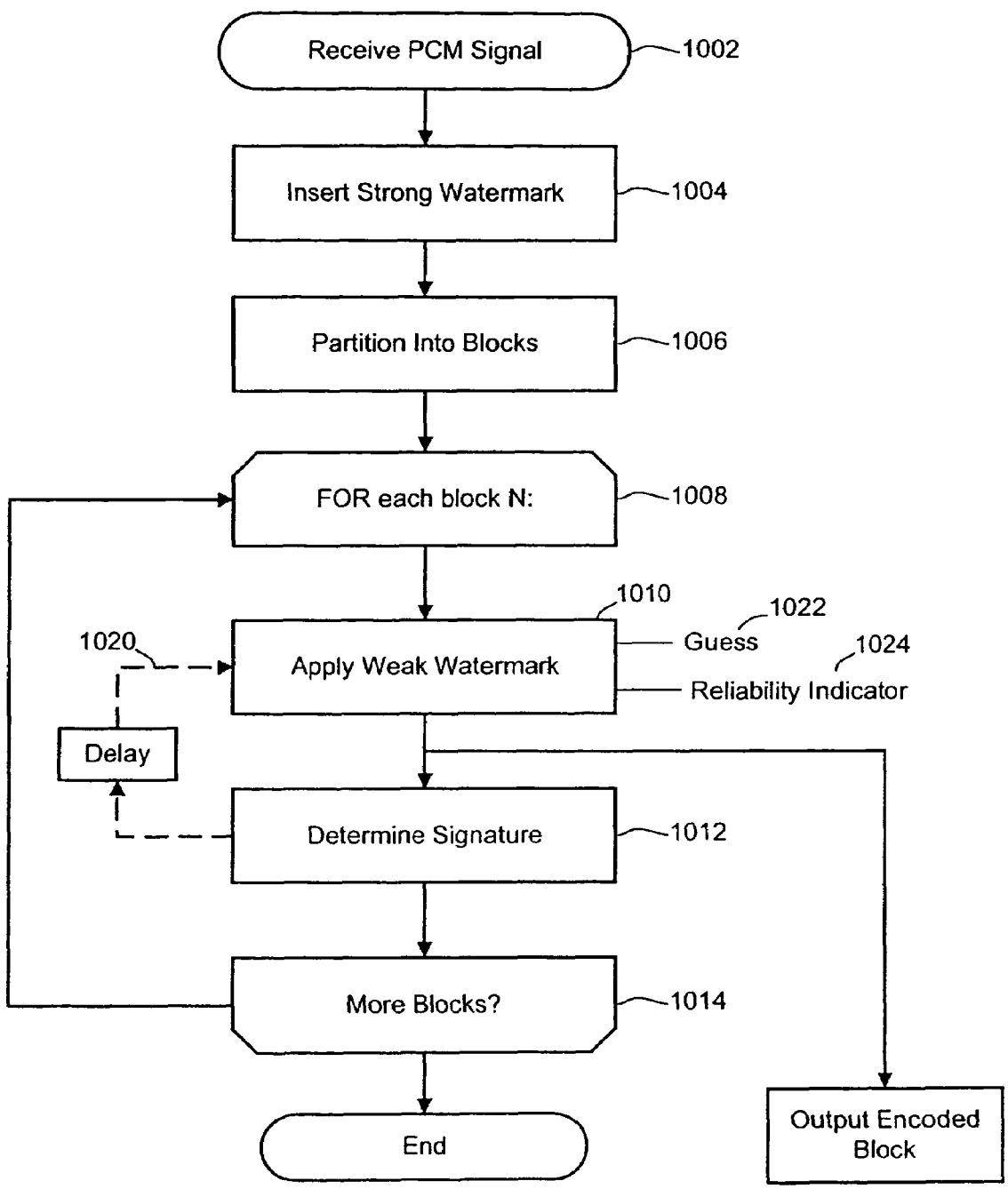
FIG. 10 is a flow chart illustrating a data encoding procedure in accordance with an embodiment of the present invention.

In a preferred embodiment the strong watermarking techniques described above are combined with the techniques described in connection with FIGS. 4A–8 to provide two levels of protection against unauthorized modifications. The operation of such an embodiment is illustrated in FIGS. 10 and 11. Referring to FIG. 10, an input PCM signal is received by encoding system 102 (1002). Encoding system 102 inserts a strong watermark into the signal (1004). Next, the signal is parsed into N blocks (1006), and a comparatively weak watermark is embedded in each block (1010), the watermark containing the signature 1020 of the preceding watermark block, a guess 1022 for use in identifying block boundaries, and, if compression is being used, an indication of the number of relevant bits in the PCM signal 1024. After this signature-containing watermark has been inserted, the signature of the watermarked block is determined (1012), so that it can be inserted into the next block.

Figure 11:
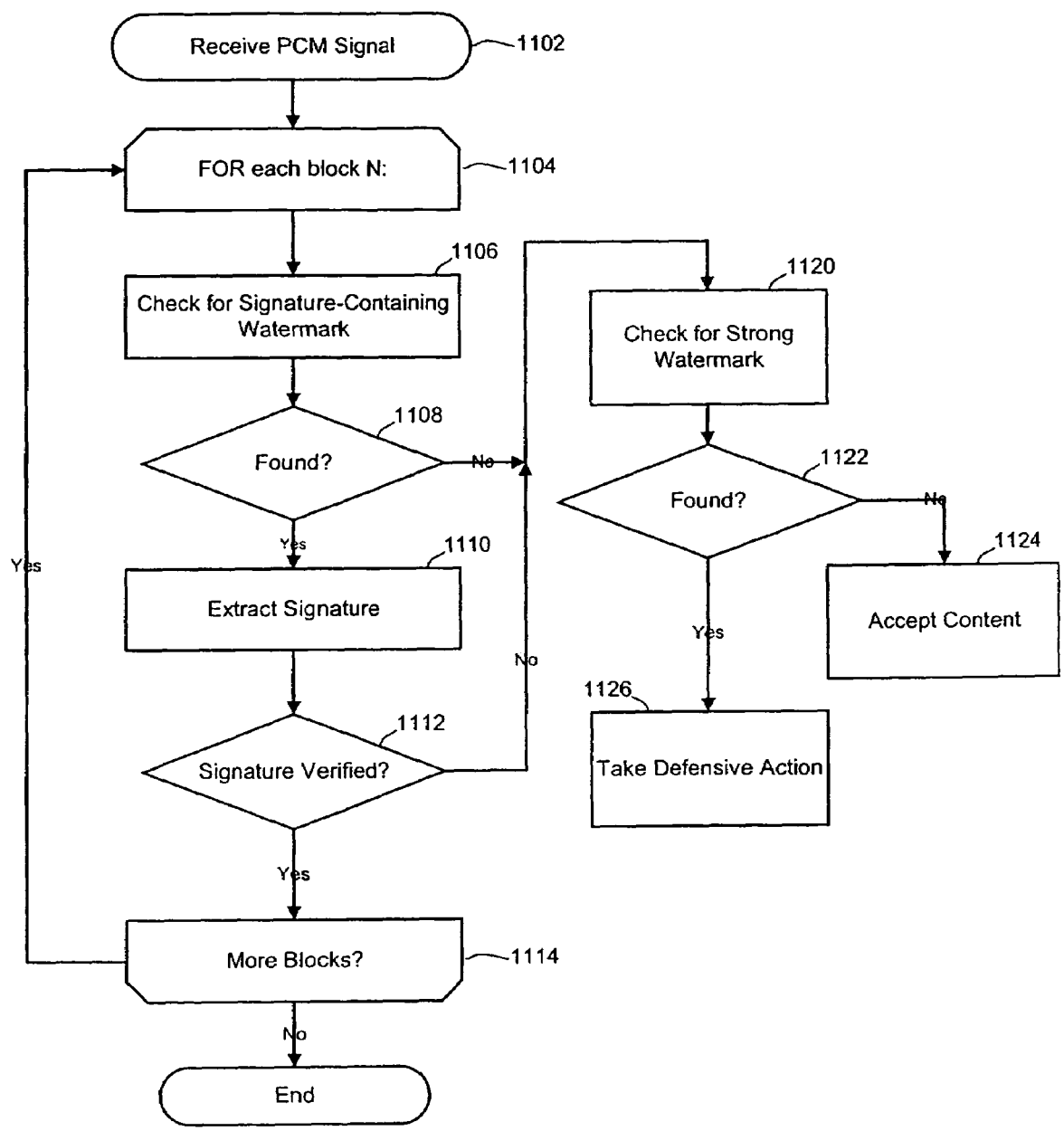
FIG. 11 is a flow chart illustrating a data decoding and authentication procedure in accordance with an embodiment of the present invention.

FIG. 11 illustrates the operation of a decoder/player 104 upon receipt of a signal that has been processed in the manner shown in FIG. 10. Referring to FIG. 11, each block of data in the signal is checked for the presence of a signature-containing watermark (1106). If this watermark is not found (i.e., a "no" exit from block 1108), then the input signal is searched for the presence of the strong mark (1120). If the strong mark is not found (a "no" exit from block 1122), then the signal is accepted, as the signal is likely to be content that was never registered (e.g., preexisting music files or legacy software). If the strong mark is found, then appropriate defensive action is taken (1126)—for example, further use of the signal can be inhibited and/or invalid data can be output—as the presence of the strong watermark, in combination with the absence of the signature-containing watermark, indicates that the content was registered at one point but was subsequently corrupted or modified. It should be appreciated, however, that any suitable response may be taken upon the detection of preexisting and/or corrupted content.

If the signature-containing watermark is found (i.e., a "yes" exit from block 1108), the signature is extracted from the watermark (1110). The signature is then verified (1112) using, e.g., the registration authority's public key, which is preferably embedded in decoder/player 104. If the signature is determined to be authentic, then the corresponding block can be played or otherwise output to the user, and processing continues with the next block of the signal (1114). However, if the signature is not authentic, then decoding system 104 checks for the presence of the strong mark as described above or takes appropriate defensive action (as might be the case if other signature-containing watermarks have already been extracted from the signal, thus indicating that the signal is registered and obviating the need to look for the strong mark) (1120–1126).

While FIGS. 10 and 11 illustrate the use of the strong watermarking scheme of the present invention in combination with the watermarking and signature techniques described in connection with FIGS. 4–8, it should be appreciated that the strong watermarking scheme can be used in connection with virtually any other encoding scheme to provide multi-level content protection. For example, without limitation, the strong watermarking techniques of the present invention can be layered on top of the encoding scheme shown in FIG. 3, or the signed progression of hash values described in commonly-assigned U.S. patent application Ser. No. 09/543,750, filed Apr. 5, 2000 and entitled "Systems and Methods for Authenticating and Protecting the Integrity of Data Streams and Other Data," which is hereby incorporated by reference.

Content Management

While parts of the foregoing discussion have focused on systems and methods for detecting unauthorized modifications to electronic content, it will be appreciated that the techniques described herein are readily adaptable for broader application. For example, the watermarking and signature techniques described above can also be used to explicitly convey content management information. In particular, the techniques described herein can provide increased efficiency and functionality to existing content control schemes. FIGS. 12A, 12B, and 12C provide a comparison of the functionality offered by a conventional watermark-based content management scheme (shown in FIG. 12A) and the functionality offered by two exemplary embodiments of the present invention (shown in FIGS. 12B and 12C).

FIG. 12A illustrates the operation of a conventional scheme for managing content via a watermark. Content that the owner wishes to prevent from being copied is marked with a strong watermark. Content that the owner wishes to allow to be copied is not marked. When a consumer attempts to copy content from or onto a device that supports this content management scheme, the content is checked for the presence of the strong mark. If the strong mark is detected, the copying operation is not allowed (1202). If the mark is not detected, the copying operation is allowed to proceed (1204).

A problem with the conventional content management scheme is that checking for the strong mark can be relatively time-consuming and/or computationally expensive. The conventional content management scheme is also unable to detect unauthorized modifications to the content. The systems and methods of the present invention can be used to solve both of these problems.

FIG. 12B illustrates the operation of a content management scheme in accordance with one embodiment of the present invention. Content that the owner wishes to allow to be copied is encoded with a strong mark and one or more signature-containing marks, as described above in connection with FIGS. 4–11. When a user attempts to make a copy of the content file, the file is checked for the presence of the signature-containing watermark(s). If the mark(s) are found, they are used to verify the authenticity of the file. If the verification process determines that the file is authentic, the copying operation is allowed to proceed (1206); otherwise, the copying operation fails (1208). If, on the other hand, the signature-containing mark is not found, the content can be checked for the presence of the strong mark. If the strong mark is found, the copying operation is prevented (1210). If the strong mark is not found, the copying operation is allowed to proceed (1212). Thus, the present invention enables some content management decisions to be made without checking for the presence of the strong mark, and makes it possible to verify the integrity of the file before authorizing its use. In addition, and as described in connection with FIGS. 9–11, this encoding scheme provides protection against unauthorized modification or removal of the signature-containing watermarks, and also supports the secure use of content that is not encoded in accordance with this content management scheme (e.g., legacy content).

It will be appreciated that there are many variations of this exemplary scheme that can be practiced without departing from the principles of the present invention. For example, content encoded with the signature-containing watermark need not be encoded with the strong mark. While such an encoding scheme would, without further modification, be unable to detect the removal of the signature-containing watermark, this scheme would be more compatible with the conventional encoding scheme shown in FIG. 12A, in which a strong mark is only inserted in content that is not to be copied. Similarly, the content management mechanisms described herein are readily adaptable to systems in which the presence of the strong mark is interpreted as a permission to copy the file, rather than as a prohibition. Moreover, it will be appreciated that although for purposes of explanation various content management mechanisms are being described in the context of controlling the copying of content from one location to another, these content management mechanisms can be just as easily used to control or manage operations other than, or in addition to, copying—such as printing, viewing, moving, or otherwise accessing, using, manipulating, and/or transmitting content.

Figure 13:
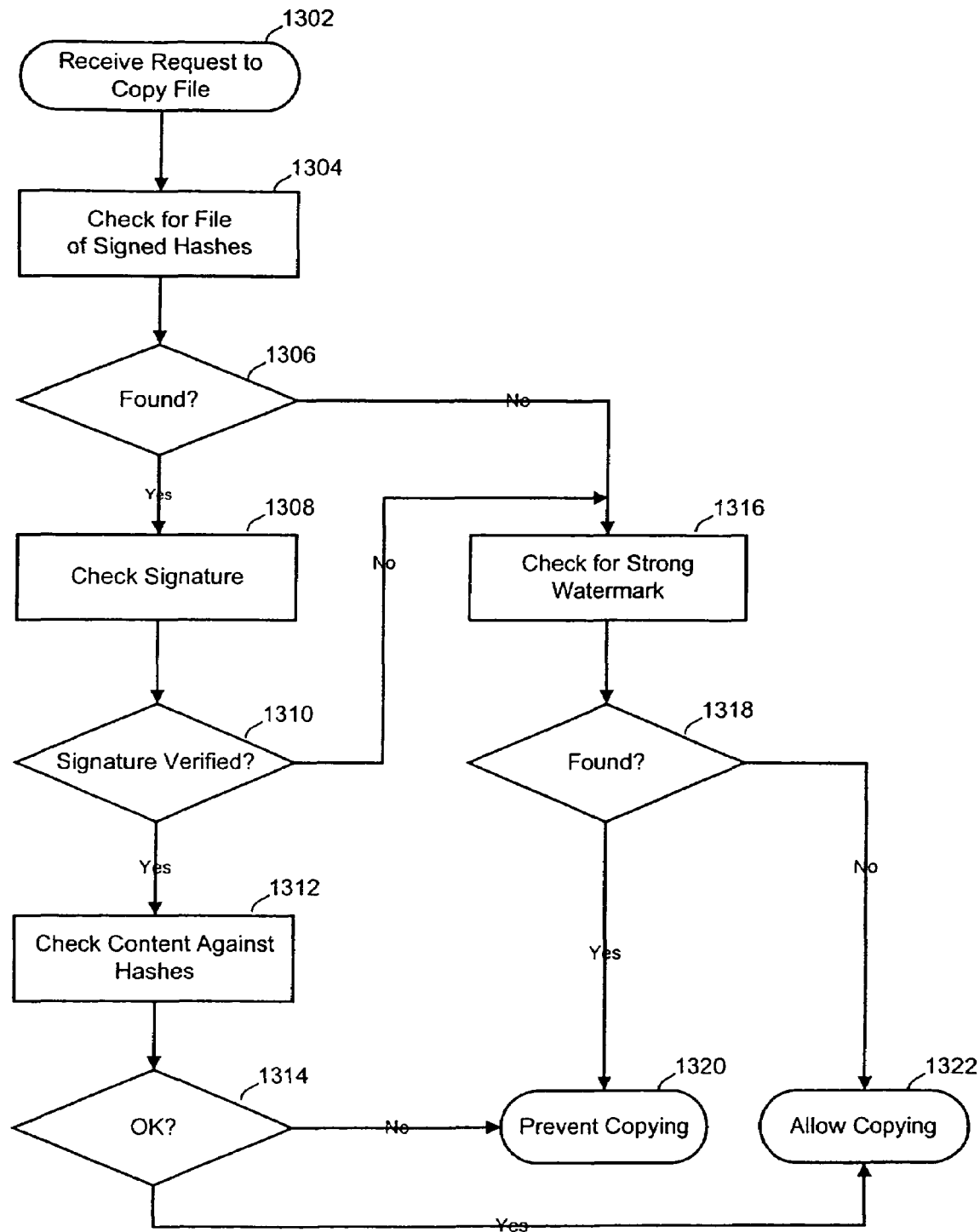
FIG. 13 illustrates the operation of a content management mechanism in accordance with an embodiment of the present invention.

FIGS. 12C and 13 illustrate the operation of another exemplary content management scheme that can be implemented using the techniques described herein. Content is first encoded with a strong watermark using the conventional technique described in connection with FIG. 12A. Hashes of the content are signed by the content owner or distributor and provided separately to the user (e.g., packaged as a separate file on a CD, made available for downloading on a server accessible over the Internet, etc.). As shown in FIG. 13, when a consumer attempts to copy a file (1302), the appropriate set of signed hashes are retrieved (1304, 1306). The authenticity of the hashes is verified, e.g., by decrypting the signature with the issuer's public key and comparing the decrypted result to a hash of the signed hashes (1308). If the hashes are authentic (i.e., a "yes" exit from block 1310), they are used to verify the authenticity of the content file, e.g., by hashing the appropriate portions of the content file and comparing those hashes with the signed hashes (1312). If the content file is authentic (i.e., a "yes" exit from block 1314), the copying operation is allowed to proceed (1214, 1322). Otherwise, copying is prevented (1216, 1320). If the file containing the signed hashes cannot be located (i.e., a "no" exit from block 1306), then the content management decision can be made in the conventional manner by checking the content for the presence of the strong mark (1316) and preventing copying if the mark is found (i.e., a "yes" exit from block 1318)(1218), or permitting copying if the mark is not found (i.e., a "no" exit from block 1318)(1220). Thus, the content management scheme shown in FIG. 12C can be used with content that has already been encoded using the conventional mechanism of FIG. 12A. The content management scheme of FIG. 12C can be offered as an add-on to users of content encoded using the conventional mechanism, the add-on having the advantage of offering consumers a way to avoid performing the time-consuming check for the strong watermark, and providing content owners with an extra level of content protection (namely, an integrity check of the content before copying is allowed). In sum, the content management scheme of FIG. 12C allows a time-consuming part of the content management process—namely, checking for the strong watermark—to be effectively performed in advance.

Figure 14:
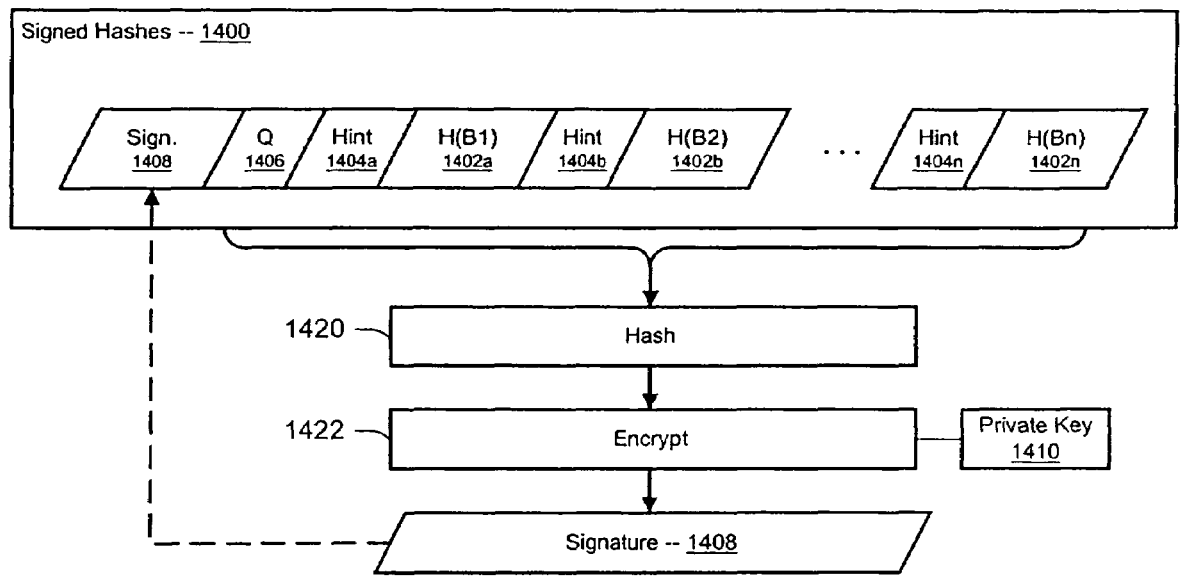
FIG. 14 illustrates an encoding scheme for use in connection with a content management mechanism of the present invention.
Figure 15:
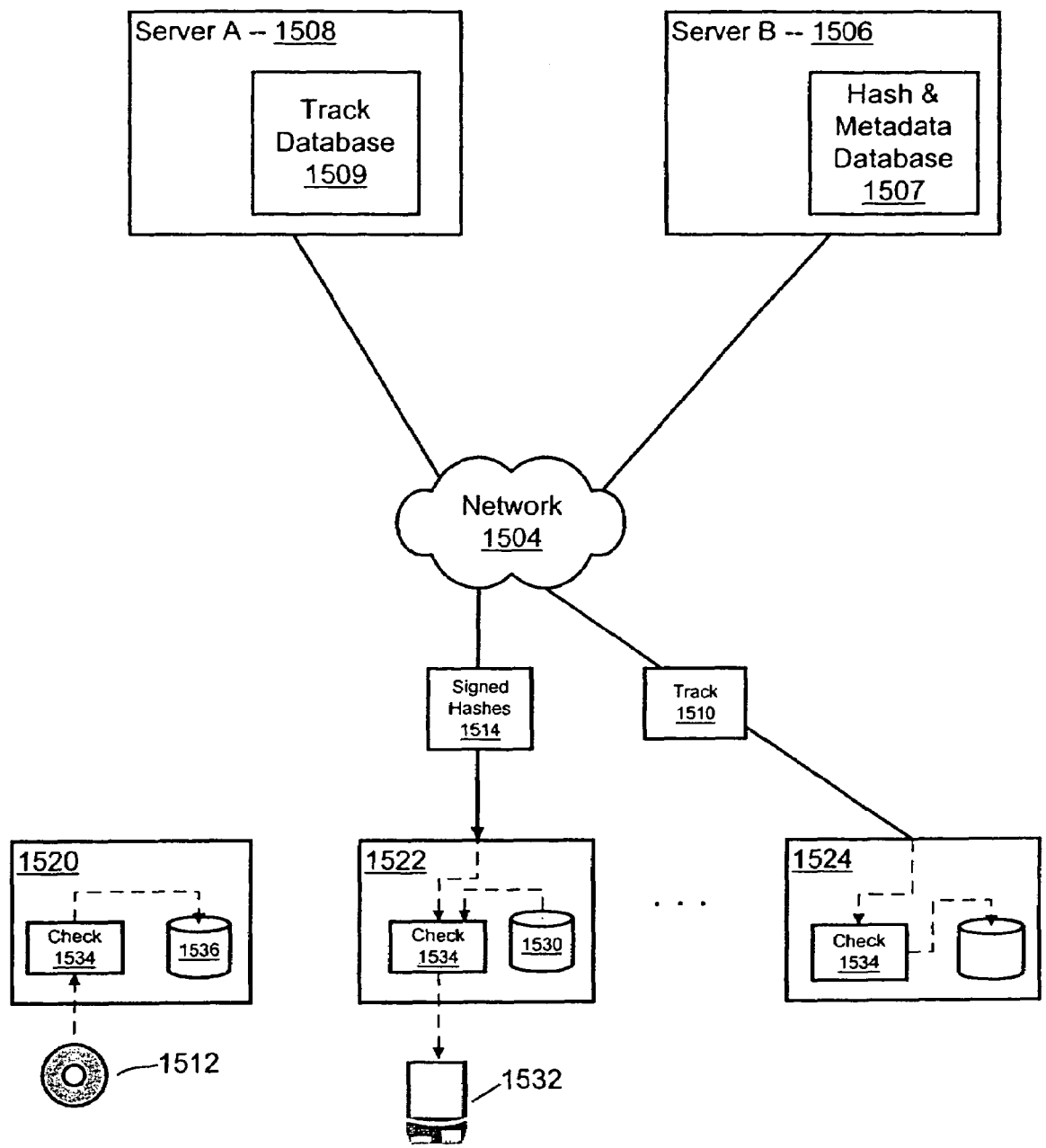
FIG. 15 illustrates a content management system in accordance with the principles of the present invention.

FIGS. 14 and 15 illustrate additional aspects of the content management mechanism described in connection with FIG. 12C and 13. As shown in FIG. 14, in a preferred embodiment the signed hash file 1400 is similar to the shared signature discussed in connection with FIG. 8. The hash file 1400 preferably includes a plurality of hash values 1402 obtained by hashing portions of the original content file. The hash file also preferably includes a plurality of hints (or guesses) 1404 that can be used to find potential matches for the hash values 1402 in the manner described above in connection with FIGS. 6A and 6B. The hash file may also contain a quality indicator 1406 that specifies the number of bits in each of the content samples that should be considered when authenticating the file, as previously described in connection with FIGS. 7A and 7B. Finally, the signed hash file contains the digital signature 1408 of the hashes 1402, hints 1404, and quality indicator 1406. The digital signature can be formed using any suitable one of the well-known digital signature techniques, and typically comprises a hash (1420) of a combination of the hashes 1402, hints 1404, and quality indicator(s) 1406, the hash being encrypted (1422) using the issuer's private key (or secret key as appropriate) 1410. In another embodiment the hints and the quality indicator are not signed. Thus, the systems and methods of the present invention enable nuanced and fault-tolerant decisions to be made regarding whether to allow use of a partially-corrupted signal. Specifically, by using hints 1404 and quality indicators 1406, as described previously herein, the content management system can allow a predetermined portion or percentage of the hash comparisons to fail before determining that the file is unauthentic. Thus, the systems and methods of the present invention are well-suited for use in situations where even data that have not been tampered with may not be bit-for-bit identical with the original data.

Content owners, authorized distributors, or the like can make signed hash files 1400 available for the content files that they wish to permit to be copied. These signed hash files 1400 can be stored on CDs or other media along with the content to which the they relate. Alternatively, or in addition, signed hash files 1400 can be made accessible over a network such as the Internet, or can be provided to the content user in any other suitable manner. Because the hashes 1402 contained in a signed hash file 1400 are signed with the private key 1410 of the content owner or distributor, the integrity of the authorization process will enjoy the same level of security as the encryption technique that is used. Thus, by choosing an appropriate key-length, it can be made computationally infeasible for an attacker to re-create the content owner's private key and provide phony hash files for a corrupted version of the content, or to provide dummy hash files for content that the owner has chosen not to create such hash files for (e.g., because the content owner does not wish to allow the content to be copied).

FIG. 15 illustrates a system and method for using the content management mechanism of FIGS. 12C, 13, and 14 to manage content in a networked environment. Consumers 1520, 1522, and 1524 obtain content from e.g., CDs 1512, networked servers 1508, or other consumers. When a consumer 1522 attempts to copy content 1530 to another device (such as portable device 1532), content-management module 1534 first performs the procedure described in connection with FIGS. 12C and 13 to determine if the copying operation should be allowed. Specifically, content management module 1534 checks for a signed hash file 1514 corresponding to content 1530. For example, content management module 1534 may connect to server 1506 to obtain hash file 1514 (and possibly other metadata associated with the content file, such as an index of its contents, the name of its producer, and so forth). Content management module 1534 may also check its own local memory for the hash file 1514, since hash file 1514 may have already been downloaded by the consumer if the consumer previously connected to server 1506 to obtain information about the content file. The content management module uses the signed hash file 1514 to control access to the file as shown in FIG. 13. If content management module 1534 is unable to find the appropriate signed hash file 1514, it checks for the presence of the strong watermark in a manner similar to that used by conventional content management mechanisms (i.e., blocks 1316–1322 of FIG. 13).

Similarly, when a consumer 1520 who is not connected to network 1504 wishes to copy a file from, e.g., CD 1512 to a hard disk 1536, portable device, or other location, content management module 1534 can look for the appropriate signed hash file on the CD and/or in the consumer's local memory. If it is not found there, the content management system searches for the strong watermark and grants or denies the consumer's request based on whether the strong mark is detected (i.e., blocks 1316–1322 of FIG. 13). As yet another example, a user 1524 who downloads a track 1510 from a server 1508 may obtain the corresponding file of signed hashes as part of the same transaction (or by separately connecting to server 1506). The user's content management system 1534 may verify the authenticity and permissions of the track before allowing the download to complete (e.g., before saving the file to the consumer's hard disk), and/or may save the hash file on the consumer's hard disk for later use in managing additional user operations.

Thus, systems and methods have been described for encoding a signal in manner that facilitates secure prevention of unauthorized use or modification. Attempts to remove the encoding can be detected and rendered ineffective, while attempts to use data that was never encoded in this manner can be detected and allowed. It should be appreciated that the systems and methods of the present invention can be used to implement a variety of content management and/or protection schemes. Although the foregoing invention has been described in some detail for purposes of clarity of understanding, it will be apparent that certain changes and modifications may be practiced within the scope of the appended claims. It should be noted that there are many alternative ways of implementing both the methods and systems of the present invention. Accordingly, the present embodiments are to be considered as illustrative and not restrictive, and the invention is not to be limited to the details given herein, but may be modified within the scope and equivalents of the appended claims.

What is claimed is:

1. A method comprising:
    receiving a request to copy an electronic file from a first computer system to a second computer system;
    checking the file for the presence of a signature-containing watermark;
    if the signature-containing watermark is detected:
        retrieving the signature from the watermark,
        using the signature to verify the authenticity of at least a portion of the file,
        if the verification is successful, granting the request to copy the file to the second computer system, and
        if the verification is not successful, denying the request to copy the file to the second computer system; and
    if the signature-containing watermark is not detected:
        checking the file for the presence of another watermark,
        if the other watermark is found, denying the request to copy the file to the second computer system, and
        if the other watermark is not found, granting the request to copy the file to the second computer system.

2. The method of claim 1, in which the other watermark is a strong watermark.

3. The method of claim 1, in which the other watermark is relatively more difficult to detect than the signature-containing watermark.

4. A method comprising:
    receiving a request to copy an electronic file from a first computer system to a second computer system;
    checking the file for the presence of a signature-containing watermark;
    if the signature-containing watermark is detected:
        retrieving the signature from the watermark,
        using the signature to verify the authenticity of at least a portion of the file,
        if the verification is successful, granting the request to copy the file to the second computer system, and
        if the verification is not successful, denying the request to copy the file to the second computer system; and
    if the signature-containing watermark is not detected:
        checking the file for the presence of another watermark,
        if the other watermark is found, granting the request to copy the file to the second computer system, and
        if the other watermark is not found, denying the request to copy the file to the second computer system.

5. The method of claim 4, in which the other watermark is a strong watermark.

6. The method of claim 4, in which the other watermark is relatively more difficult to detect than the signature-containing watermark.

7. A method comprising:
    receiving a request to use an electronic file in a predefined manner;
    checking the file for the presence of a signature-containing watermark;
    if the signature-containing watermark is detected:
        retrieving the signature from the watermark,
        using the signature to verify the authenticity of at least a portion of the file,
        if the verification is successful, granting the request to use the file in the predefined manner, and
        if the verification is not successful, denying the request to use the file in the predefined manner; and
    if the signature-containing watermark is not detected:
        checking the file for the presence of another watermark,
        if the other watermark is found, denying the request to use the file in the predefined manner, and
        if the other watermark is not found, granting the request to use the file in the predefined manner.

8. The method of claim 7, in which the predefined manner comprises printing contents of the file.

9. The method of claim 7, in which the predefined manner comprises viewing contents of the file.

10. The method of claim 7, in which the predefined manner comprises modifying the file.

11. The method of claim 7, in which the predefined manner comprises one or more of printing, copying, viewing, and modifying the file.

12. The method of claim 7, in which the other watermark is a strong watermark.

13. The method of claim 7, in which the other watermark is relatively more difficult to detect than the signature-containing watermark.

14. The method of claim 13, in which the predefined manner comprises one or more of printing, copying, viewing, and modifying the file.

15. A method comprising:
    receiving a request to use an electronic file in a predefined manner;
    checking the file for the presence of a signature-containing watermark;
    if the signature-containing watermark is detected:
        retrieving the signature from the watermark,
        using the signature to verify the authenticity of at least a portion of the file,
        if the verification is successful, granting the request to use the file in the predefined manner, and if the verification is not successful, denying the request to use the file in the predefined manner; and if the signature-containing watermark is not detected:
checking the file for the presence of another watermark,
if the other watermark is found, granting the request to use the file in the predefined manner, and
if the other watermark is not found, denying the request to use the file in the predefined manner.

16. The method of claim 15, in which the predefined manner comprises printing contents of the file.

17. The method of claim 15, in which the predefined manner comprises viewing contents of the file.

18. The method of claim 15, in which the predefined manner comprises modifying the file.

19. The method of claim 15, in which the predefined manner comprises one or more of printing, copying, viewing, and modifying the file.

20. The method of claim 15, in which the other watermark is a strong watermark.

21. The method of claim 15, in which the other watermark is relatively more difficult to detect than the signature-containing watermark.

22. The method of claim 21, in which the predefined manner comprises one or more of printing, copying, viewing, and modifying the file.

* * * * *